United States Patent [19]
Kawaguchi et al.

[11] Patent Number: 5,797,663
[45] Date of Patent: Aug. 25, 1998

[54] BRAKE SYSTEM HAVING PUMP TO START BY FORECAST OF BRAKING

[75] Inventors: Hiroshi Kawaguchi; Akio Okada, both of Mishima; Masashi Ohta, Susono, all of Japan

[73] Assignee: Toyota Jidosha Kabushiki Kaisha, Toyota, Japan

[21] Appl. No.: 976,620

[22] Filed: Nov. 24, 1997

Related U.S. Application Data

[63] Continuation of Ser. No. 754,749, Nov. 21, 1996, abandoned, which is a continuation of Ser. No. 520,430, Sep. 30, 1995, abandoned.

[30] Foreign Application Priority Data

Sep. 28, 1994 [JP] Japan ................... 6-258657
Jul. 14, 1995 [JP] Japan ................... 7-201779

[51] Int. Cl.$^6$ ................................................ A60T 8/86
[52] U.S. Cl. .................. 303/146; 303/113.2; 303/193; 188/196 A
[58] Field of Search .................... 303/146, 148, 303/149, 155, 162, 166, 193, DIG. 3, DIG. 4, 113.2; 188/196 A

[56] References Cited

U.S. PATENT DOCUMENTS

| | | | |
|---|---|---|---|
| 4,327,414 | 4/1982 | Klein | 303/155 |
| 4,733,756 | 3/1988 | Harrison | 188/196 A |
| 4,861,118 | 8/1989 | Burckhardt et al. | |
| 5,054,861 | 10/1991 | Resch | 303/113.2 |
| 5,061,017 | 10/1991 | Kirstein | 303/113.2 |
| 5,206,808 | 4/1993 | Inoue et al. | 303/146 |
| 5,236,256 | 8/1993 | Schmidt et al. | 303/113.2 |
| 5,286,099 | 2/1994 | Fujita et al. | 303/193 |
| 5,308,153 | 5/1994 | Kidston et al. | 303/162 |
| 5,328,256 | 7/1994 | Ohata et al. | 303/146 |
| 5,332,056 | 7/1994 | Niibe et al. | 303/193 |
| 5,342,120 | 8/1994 | Zimmer et al. | 303/113.2 |

FOREIGN PATENT DOCUMENTS

| | | |
|---|---|---|
| 3839178 A1 | 8/1989 | Germany . |
| 40 37 468 A1 | 5/1992 | Germany . |
| 43 12 118 A1 | 10/1993 | Germany . |
| 43 29 140 C1 | 12/1994 | Germany . |
| A-3-45453 | 2/1991 | Japan . |

*Primary Examiner*—Matthew C. Graham
*Attorney, Agent, or Firm*—Oliff & Berridge, PLC

[57] ABSTRACT

In a brake system of a vehicle adapted to be operated automatically, the brake system includes a forecasting mechanism for forecasting a need of automatic braking, and a pump to provide a source of a pressurized working fluid for the automatic braking is started when a need of an automatic braking is forecast. By such a need forecast starting of the pump, the brake system can automatically apply an effective braking to a vehicle wheel or wheels, with no accumulator for storing the pressurized working fluid. The pump need forecasting may depend upon an estimation of a turn behavior of the vehicle and/or a detection of an obstacle in front of the vehicle.

9 Claims, 17 Drawing Sheets

BRAKE SYSTEM HAVING PUMP TO START BY FORECAST OF BRAKING

This is a Continuation of application Ser. No. 08/754,749 filed Nov. 21, 1996 now abandoned, which is a continuation of 08/520,430 filed Aug. 30, 1995, now abandoned.

BACKGROUND OF THE INVENTION

1. Field of the Invention

The present invention relates to a brake system of a vehicle such as an automobile, and more particularly, to a brake system of a vehicle incorporating an automatic control means for automatically controlling braking forces applied to the vehicle wheels according to the driving conditions of the vehicle.

2. Description of the Prior Art

As a system for automatically controlling braking forces applied to the vehicle wheels of a vehicle such as an automobile, there is known a brake system which comprises a means for detecting a steering angle, a means for detecting vehicle speed, a means for detecting yaw rate, a means for detecting a tire grip limit vehicle speed in relation to the steering angle, a means for determining a target yaw rate in relation to the steering angle and the tire grip limit vehicle speed, and braking means provided at the respective vehicle wheels, and controls the braking forces applied to the vehicle wheels at the inside and outside of a turn of the vehicle such that, when the vehicle speed exceeds the tire grip limit vehicle speed, the vehicle speed is decreased to the tire grip limit vehicle speed in relation to the yaw rate which is also approached to a target yaw rate, as shown in Japanese Patent Laid-open Publication 3-45453.

Since such a brake system automatically controls the braking forces applied to the vehicle wheels of a vehicle such that the vehicle speed does not exceed the tire grip limit vehicle speed in relation to the yaw rate while the yaw rate is approached toward the target yaw rate, undesirable turning behaviors of the vehicle such as a spinning, a drifting out, etc. will be avoided.

In the brake system described in the above-mentioned publication and other similar prior art systems, there are required not only a pump to provide a source of a high pressure working fluid for operating the brake wheel cylinders in addition to the brake master cylinder adapted to be operated by the driver but also an accumulator for storing the high pressure working fluid to ensure a high responsiveness of the automatic brake control. Such a high pressure accumulator needs a high manufacturing cost and a large mounting space.

SUMMARY OF THE INVENTION

In spite of the conventional concept that such a high pressure working fluid accumulator is an indispensable component of such an automatically operating brake system, the present invention recognizes that such an automatically operating brake system can operate at a high responsiveness with no such high pressure working fluid accumulator so as to timely apply controlled braking forces to corresponding vehicle wheels, if a pump for the working fluid is started to operate with a small time advance against a moment at which the braking forces are actually required, said time advancement being available by a forecasting analysis of a parameter or parameters related with driving of the vehicle.

Based upon the above concept, the present invention proposes a brake system of a vehicle having a plurality of vehicle wheels, said brake system being operative with a working fluid and comprising a plurality of wheel cylinders selectively supplied with the working fluid to apply a braking force to at least one of said plurality of vehicle wheels, a pump means for pressurizing the working fluid, and an automatic control means for controlling operation of said pump means and supply of the working fluid pressurized by said pump means to said wheel cylinders, wherein said automatic control means comprises a means for forecasting a need of operation of said pump means based upon at least one parameter related with driving of the vehicle, and controls operation of said pump means so as at least to start the operation thereof according to the need of operation thereof forecast by said forecasting means.

According to such a brake system, the pressurized working fluid for operating the wheel cylinders to timely brake the vehicle wheels is available with no provision of a cost and space consuming high pressure working fluid accumulator.

In the brake system of the above-mentioned construction, since the pump means is not operated unless an automatic braking operation is forecast, it is avoided that the working fluid is uselessly pressurized, while when an automatic braking operation is forecast, the pump means is started to operate in advance of the actual operation of working fluid changeover or control valves adapted to control supply or exhaust of the working fluid to or from the brake wheel cylinders, such that the working fluid is ready at a sufficiently pressurized condition when the working fluid changeover or control valves are actually operated, thereby ensuring a high responsiveness of the braking force control.

According to a further detail of the present invention, said forecasting means may comprise a means for estimating a turn behavior of the vehicle, and said automatic control means may controls supply of the working fluid to said wheel cylinders based upon an estimated turn behavior of the vehicle so as to stabilize an actual turn behavior of the vehicle.

In more detail, said estimation may be based upon at least one parameter which indicates instability of dynamic movement of the vehicle during a turn of the vehicle, and said automatic control means may start the operation of the pump means when said parameter traverses a first threshold value. Further, said automatic control means may start the control of supply of the working fluid to said wheel cylinders when said parameter traverses a second threshold value greater than said first threshold value.

According to a further detail of the present invention, said automatic control means may vary the rate of supply of the working fluid to a selected one of said wheel cylinders such that the working fluid is supplied to said selected wheel cylinder at a higher rate in a starting period of supply as the duration of operation of the pump means after the start thereof is shorter.

By this arrangement, the delay of uprising of the pressure of the working fluid from the start of operation of the pump means is desirably compensated.

According to a still further detail of the present invention, said forecasting means may comprise a means for detecting an obstacle in front of the vehicle, and said automatic control means may operate the pump means based upon a detection of an obstacle by said obstacle detection means.

In this case, said obstacle detection means may detect an obstacle with a moving performance thereof, and said automatic control means may operate the pump means with a variable limit of approach to the obstacle according to the moving performance thereof such that said limit of approach is larger when the obstacle is stationary than when the obstacle is moving in the same direction as the vehicle.

An obstacle in front of the vehicle is a very important parameter for automatically operating the brake system. Since such an obstacle is detectable with a good time advancement against the actual operation of the brake system, the brake system according to the present invention is most desirably adaptable for such a parameter. In this case, when the obstacle is conceived with distinction of its moving character, even more desirable automatic brake control is available.

According to a still further detail of the present invention, said automatic control means may provisionally supply the working fluid to a selected one of said wheel cylinders at a predetermined pressure when the pump means was started according to a forecast need of operation thereof. In this case, when the brake system comprises a brake pad and a rotor cooperating with said selected wheel cylinder and incorporating an idle clearance between said brake pad and said rotor, said provisional supply of the working fluid may be such that said idle clearance is just cancelled.

BRIEF DESCRIPTION OF THE DRAWING

In the accompanying drawing.

DESCRIPTIONS OF THE EMBODIMENTS

In the following, several embodiments of the present invention will be described in detail with reference to the accompanying drawing.

Figure 1:
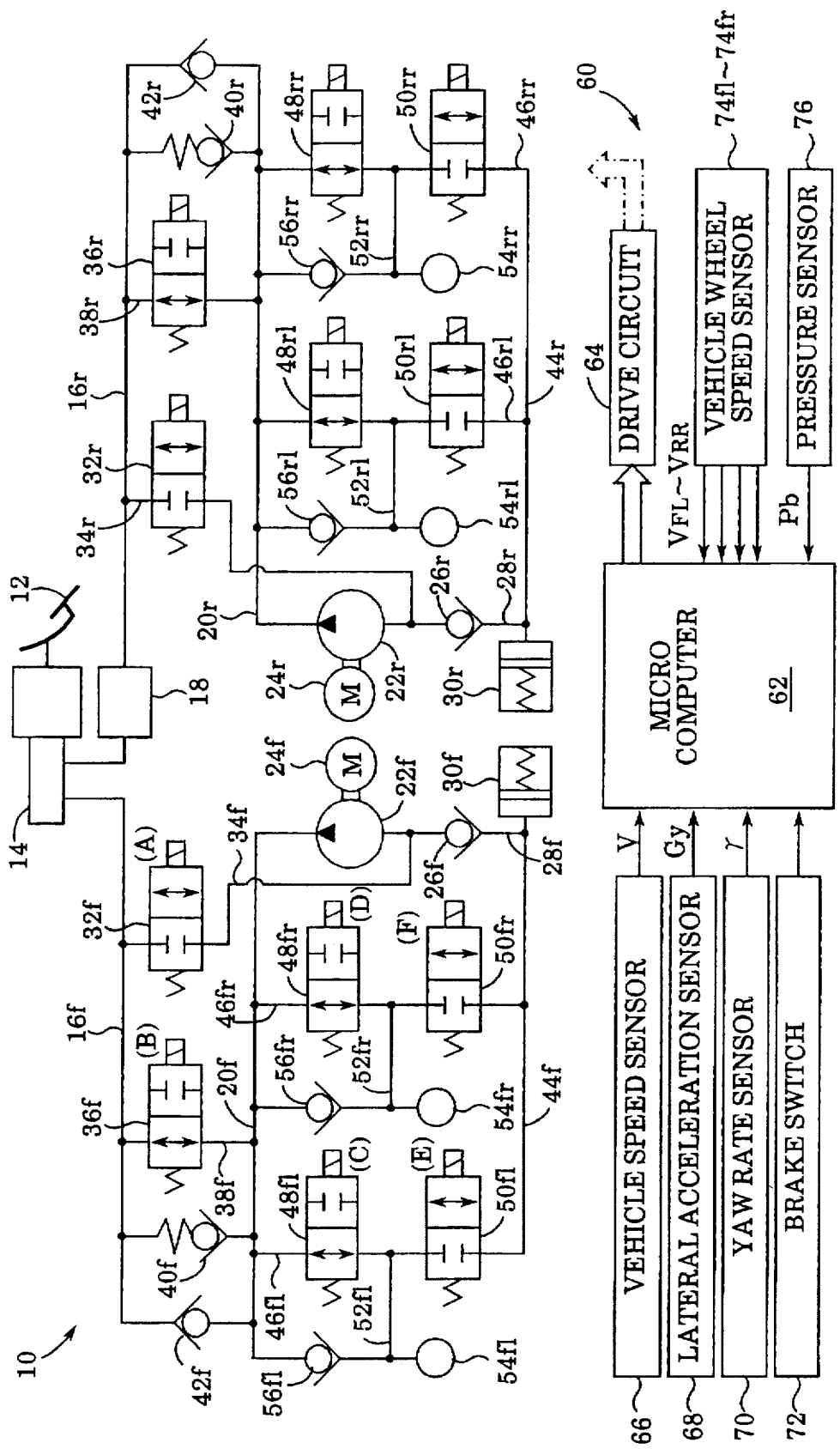
FIG. 1 is a diagrammatical view showing a fluid hydraulic circuit and an electrical control means of a first embodiment of the brake system according to the present invention.

Referring to FIG. 1, showing a hydraulic circuit and an electrical control means of a first embodiment of the brake system according to the present invention, the brake system generally designated by 10 comprises a master cylinder 14 which responds to a stepping-on of a brake pedal 12 by a driver to deliver a working fluid from the first and second ports thereof, said first port being connected with a working fluid pressure control passage 16f for front vehicle wheels, while said second port is connected, via a proportional valve 18, with a working fluid pressure control passage 16r for rear vehicle wheels. The brake system 10 further comprises fluid pumps 22f and 22r for delivering the working fluid at a high pressure to a high pressure passage 20f for the front vehicle wheels and a high pressure passage 20r for the rear vehicle wheels, respectively, wherein the fluid pumps 22f and 22r are driven by electric motors 24f and 24r, respectively, to draw up the working fluid through supply passages 28f and 28r including check valves 26f and 26r from reservoirs 30f and 30r, respectively.

The front working fluid pressure control passage 16f is connected with the supply passage 28f at a point thereof downstream of the check valve 26f by a passage 34f including a changeover valve 32f. Further, the front working fluid pressure control passage 16f is connected with the front high pressure passage 20f by a passage 38f including a changeover valve 36f. Still further, the front working fluid pressure control passage 16f is connected with the front high pressure passage 20f by a parallel combination of a relief valve 40f and a check valve 42f. The changeover valve 32f is a normally closed (normally blocked) solenoid valve, while the changeover valve 36f is a normally open (normally through) solenoid valve.

Similarly, the rear working fluid pressure control passage 16r is connected with the supply passage 28r at a point thereof downstream of the check valve 26r by a passage 34r including a changeover valve 32r. Further, the rear working fluid pressure control passage 16r is connected with the rear high pressure passage 20r by a passage 38r including a changeover valve 36r. Still further, the rear working fluid pressure control passage 16r is connected with the rear high pressure passage 20r by a parallel combination of a relief valve 40r and a check valve 42r. The changeover valve 32r is a normally closed (normally blocked) solenoid valve, while the changeover valve 36r is a normally open (normally through) solenoid valve.

A return passage 44f for the front vehicle wheels is connected to the reservoir 30f, and between the front high pressure passage 20f and the front return passage 44f there are connected a control valve 48fl constructed as a normally open (normally through) type solenoid valve and a control valve 50fl constructed as a normally closed (normally blocked) solenoid valve in series by a connection passage 46fl for the front left vehicle wheel, and also a control valve 48fr constructed as a normally open (normally through) type solenoid valve and a control valve 50fr constructed as a normally closed (normally blocked) type solenoid valve in series by a connection passage 46fr for the front right vehicle wheel.

A mid point of the connection passage 46fl between the control valve 48fl and the control valve 50fl is connected with a wheel cylinder 54fl of the front left vehicle wheel by a connection passage 52fl, while the wheel cylinder 54fl is also connected with the front high pressure passage 20f by a check valve 56fl provided at an upstream point of the connection of the passage 52fl, said check valve 56fl being oriented to allow the working fluid to flow only from the wheel cylinder 54fl toward the front high pressure passage 20f. Similarly, a mid point of the connection passage 46fr between the control valve 48fr and the control valve 50fr is connected with a wheel cylinder 54fr of the front right vehicle wheel by a connection passage 52fr, while the wheel cylinder 54fr is also connected with the front high pressure passage 20f by a check valve 56fr provided at an upstream position of the connection point of the connection passage 52fr, said check valve 56fr being oriented to allow the working fluid to flow only from the wheel cylinder 54fr toward the front high pressure passage 20f.

In the same manner as the hydraulic system for the front vehicle wheels, a return passage 44r for the rear vehicle wheels is connected to the rear reservoir 30r, and between the rear high pressure passage 20r and the return passage 44r there are connected a control valve 48rl constructed as a normally open (normally through) type solenoid valve and a control valve 50rl constructed as a normally closed (normally blocked) type solenoid valve in series by a connection passage 46rl for the rear left vehicle wheel and also a control valve 48rr constructed as a normally open (normally through) type solenoid valve and a control valve 50rr constructed as a normally closed (normally blocked) type solenoid valve in series by a connection passage 46rr.

A mid point of the connection passage 46r between the control valve 48rl and the control valve 50rl is connected with a wheel cylinder 54rl of the rear left vehicle wheel by a connection passage 52rl, while the wheel cylinder 54rl is connected with the rear high pressure passage 20rl by a check valve 56rl provided at an upstream side of the connection point of the connection passage 52rl, the check valve 56rl being oriented to allow the working fluid to flow only from the wheel cylinder 54rl toward the rear high pressure passage 20r. Similarly, a mid point of the connection passage 46rr between the control valve 48rr and the control valve 50rr is connected with a wheel cylinder 54rr of the rear right vehicle wheel, while the wheel cylinder 54rr is also connected with the rear high pressure passage 20r by a check valve 56rr provided at an upstream side of the connection point of the connection passage 52rr, said check valve being oriented to allow the working fluid to flow only from the wheel cylinder 54rr toward to the rear high pressure passage 20r.

When the pumps 22f and 22r are driven, with the changeover valves 32f and 32r being opened, with the changeover valves 36f and 36r being closed, and with the control valves 48fl, 48fr, 48rl and 48rr being maintained in the open positions, such that the wheel cylinders 54fl, 54fr, 54rl and 54rr are connected with the high pressure passages 20f and 20r via the control valves 48fl, 48fr, 48rl and 48rr, then the pressure in the wheel cylinders is raised. Conversely, regardless of changing over of the changeover valves 32f, 32r, 36f and 36r, when the control valve 48fl, 48fr, 48rl and 48rr are closed, while the control valves 50fl, 50fr, 50rl and 50rr are opened, such that the wheel cylinders are connected to the return passages 44f and 44r, then the pressure in the wheel cylinders lowers. Further, regardless of the changing over of the changeover valves 32f, 32r, 36f and 36r, when the control valves 50fl, 50fr, 50rl and 50rr are maintained at the closed position, and the control valves 48fl, 48fr, 48rl and 48rr are also closed, such that the wheel cylinders are disconnected from both of the high pressure passages 20f and 20r and the return passages 44f and 44r, then the pressures in the wheel cylinders remain unchanged.

Thus, in the brake system 10, when the changeover valves 32f and 36f and the changeover valves 32r and 36r are in the changed over positions shown in FIG. 1, then the wheel cylinders 54fl, 54fr, 54rl and 54rr generate braking forces in accordance with the stepping-on of the brake pedal 12 by the driver, whereas when changeover valves are changed over such that the changeover valves 32f and 32r are opened and the changeover valves 36f and 36r are closed, then the braking forces of the respective vehicle wheels are controlled by an open/close control of the control valves 48fl–48rr and 50fl–50rr independently of the stepping on of the brake pedal 12.

In the first embodiment shown in FIG. 1, as is described in detail hereinbelow, the changeover valves 32f, 32r, 36f and 36r, and the control valves 48fl, 48fr, 48rl, 48rr, 50fl, 50fr, 50rl and 50rr are controlled by an electric control means 60 which consists of a microcomputer 62 and a drive circuit 64. Although not shown in detail in the figure, the microcomputer 62 may be of a general construction having a central processing unit (CPU), a read only memory (ROM), a random access memory (RAM), input and output means, and a by-directional common bus interconnecting these components.

The input means of the microcomputer 62 is supplied with a signal indicating vehicle speed V from a vehicle speed sensor 66, a signal indicating lateral acceleration Gy of the vehicle body from a lateral acceleration sensor 68 mounted at a substantial center of gravity of the vehicle body, a signal indicating yaw rate r of the vehicle body from a yaw rate sensor 70, a signal indicating on/off condition of a brake switch (BS) 72 therefrom, signals indicating turning speed (circumferential speed) of the left and right front vehicle wheels (Vfl, Vfr) and the left and right rear vehicle wheels (Vrl, Vrr) from the respective vehicle wheel turn speed sensors 74fl–74rr, and a signal indicating internal pressure Pb in the front working fluid pressure control passage 16f from a pressure sensor 76.

In the following, the descriptions of operations will be made with reference to the front brake system, as the operations of the rear brake system is the same as those of the front brake system.

The ROM of the microcomputer 62 stores various control flows and maps as described hereinbelow, while the CPU conducts various calculations based upon the parameters detected by the above-mentioned various sensors to estimate a turn behavior of the vehicle, and when the turn behavior of the vehicle becomes unstable, it instructs to open the changeover valve 32f, to close the changeover valve 36f, and to drive the pump 22f, and if the turn behavior of the vehicle becomes more unstable, it instructs the on/off control of the control valves 48fl, 48fr, 50fl and 50fr for the front vehicle wheels positioned at the outside of the turn so as to apply a braking force thereto, in order to stabilize the turn behavior of the vehicle.

Figure 2:
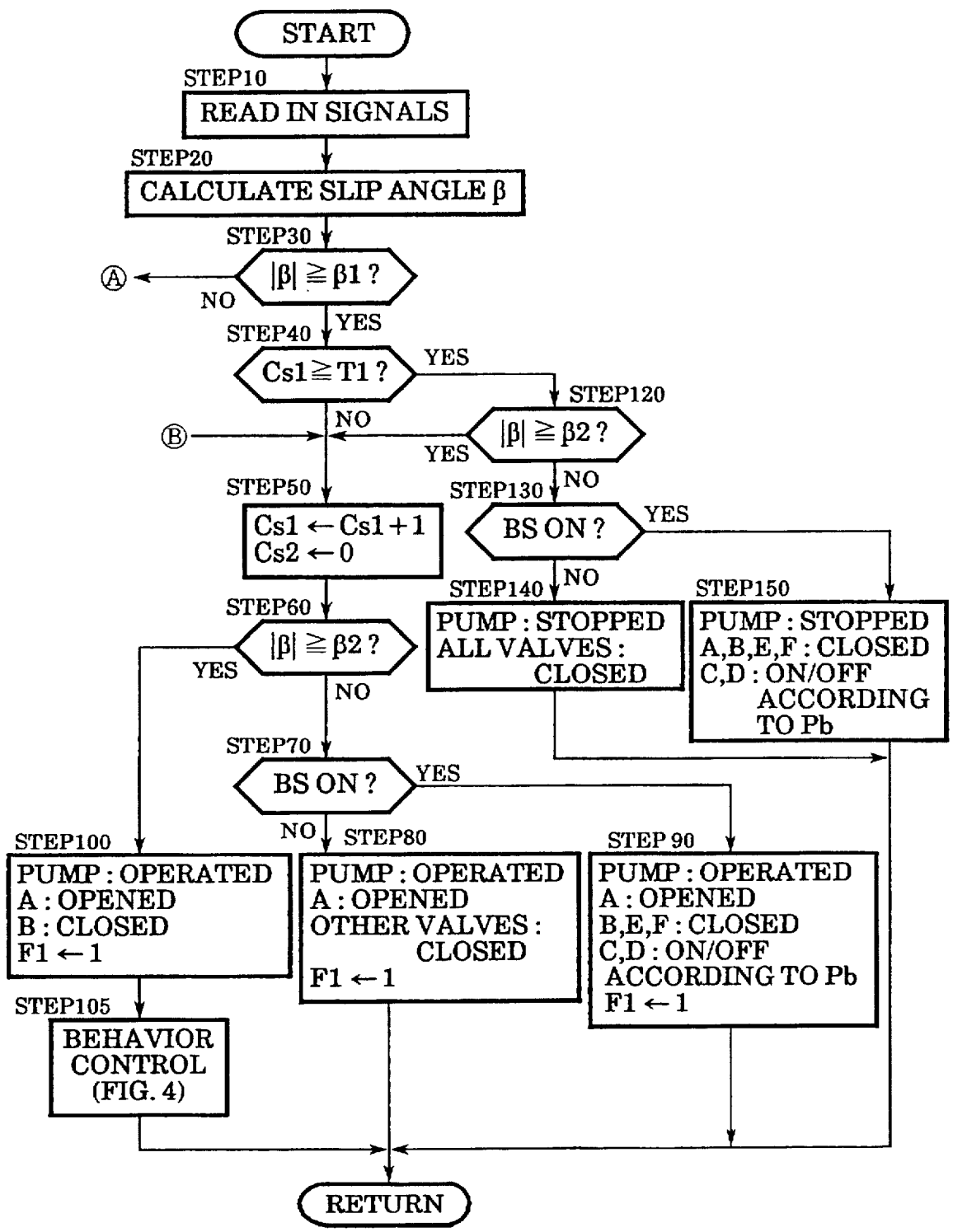
FIG. 2 is a flowchart showing a part of a braking force control routine of the first embodiment.
Figure 3:
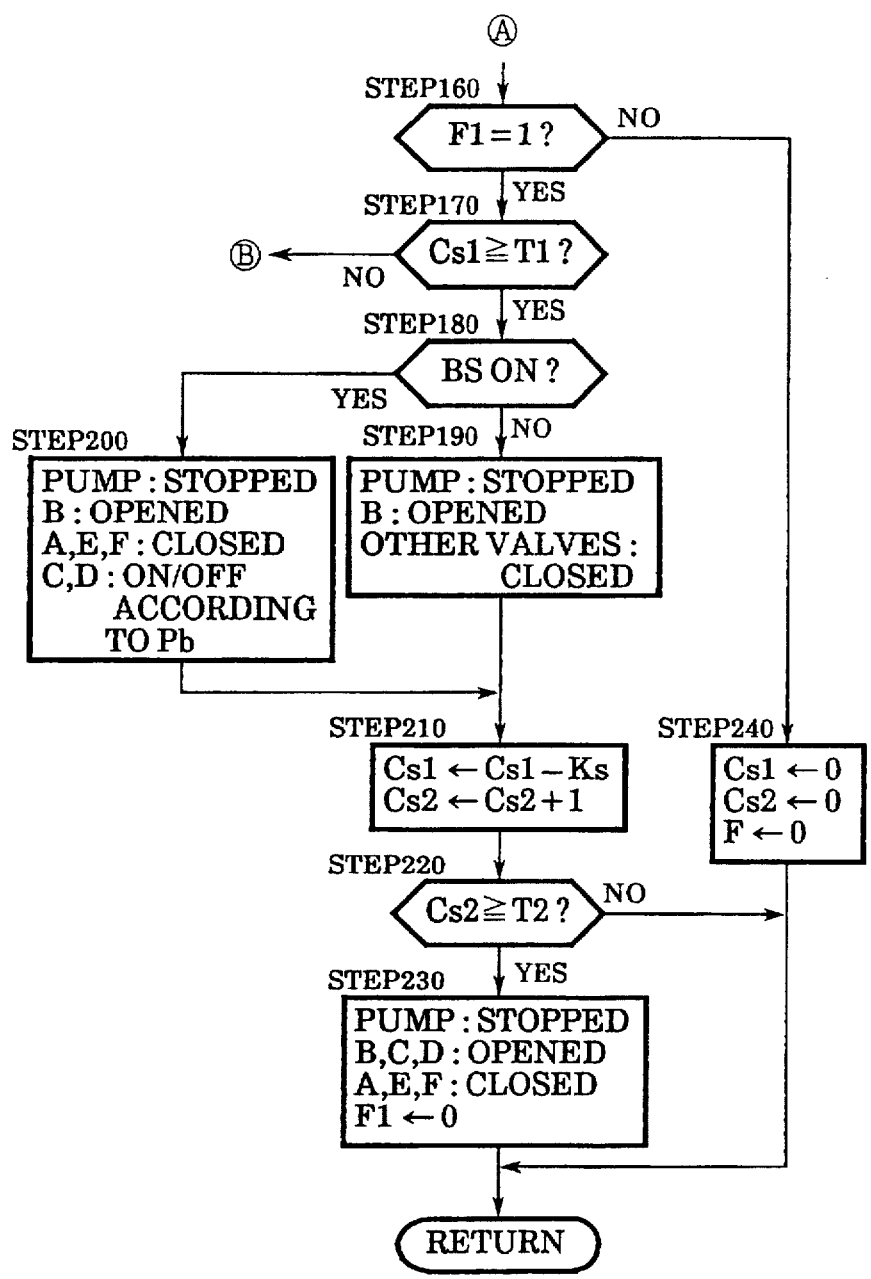
FIG. 3 is a flowchart showing the remaining part of the braking force control routine of the first embodiment.

Referring to the flowcharts shown in FIGS. 2 and 3, the braking force control according to the first embodiment will be described. The control according to the flowcharts shown in FIGS. 2 and 3 is started at the closing of an ignition switch not shown in the figure and cyclically repeated with a predetermined time interval. Prior to the execution of step 10, the system is initialized so that flags F and F1 are reset to zero, and count values Cs1 and Cs2 of the counts are reset to zero.

In the following description, for the purpose of convenience, with respect to the front vehicle wheels, the changeover valves 32f and 36f are called changeover valves A and B, the control valves 48fl and 48fr are called control valves C and D, and the control valves 50fl and 50fr are called control valves E and F, respectively, as also indicated in FIG. 1.

First in step 10, the signal indicating vehicle speed V detected by the vehicle sensor 66 and other signals are read in, and in step 20 calculations are made for a deviation of lateral acceleration as a difference between the lateral acceleration Gy and the products $V^*r$ of vehicle speed V and yaw rate r, i.e. $Gy-V^*r$, said deviation of lateral acceleration being a lateral acceleration Vyd in the side sliding of the vehicle, for a side sliding velocity Vy of the vehicle body by integrating the lateral acceleration deviation Vyd, and for a slip angle $\beta$ of the vehicle body as a ratio of the side sliding velocity Vy to longitudinal velocity Vx of the vehicle body (=vehicle speed V), i.e. Vy/Vx.

The calculation of the slip angle $\beta$ does not relate to the essence of the present invention, and therefore, the slip angle may be calculated according to any convenient method. For example, it may be obtained by detecting the longitudinal velocity Vx and the lateral sliding velocity Vy of the vehicle body by a Doppler type vehicle speed sensor acting against the ground to obtain the ratio Vy/Vx.

In step 30, it is tested if the absolute value of the vehicle body slip angle $\beta$ is equal to or greater than a first standard value $\beta1$ (a positive constant), and if the answer is no, the control process proceeds to step 160, whereas if the answer is yes, the control process proceeds to step 40, and it is tested if the count number Cs1 of the counter is equal to or greater than a standard value T1. If the answer of step 40 is yes, the control process proceeds to step 120, whereas if the answer is no, the control process proceeds to step 50, where the count number Cs1 is incremented by 1, while the count number Cs2 is reset to zero. What the count numbers Cs1 and Cs2 respectively mean will be understood later.

In step 60, it is tested if the absolute value of the vehicle body slip angle $\beta$ is equal to or greater than a second standard value $\beta2$ (a positive constant greater than $\beta1$), and if the answer is yes, the control process proceeds to step 100, whereas if the answer is no the process proceeds to step 70, where it is tested if the brake switch 72 is on, i.e. if the braking action is being done by the driver.

If the answer of step 70 is no, then in step 80 the pump 22f is operated, the changeover valve A is opened, the changeover valve B and the control valves C–F are closed, and flag F1 is set to 1.

In the following descriptions, it is simply described with respect to some steps such that the pump 22f is operated or stopped, the changeover valves A and B are opened or closed, and the control valves C–F are opened or closed. However, it is to be noted that, when the pump 22f is already in operation as started at a preceding step of the current flow cycle or a certain step in a preceding flow cycle, the action at a step that "the pump 22f is operated" means, as a matter of course, to maintain the operation of the pump. This is the same with respect to stopping the pump, and opening and closing of the changeover valves and the control valves.

Figure 5:
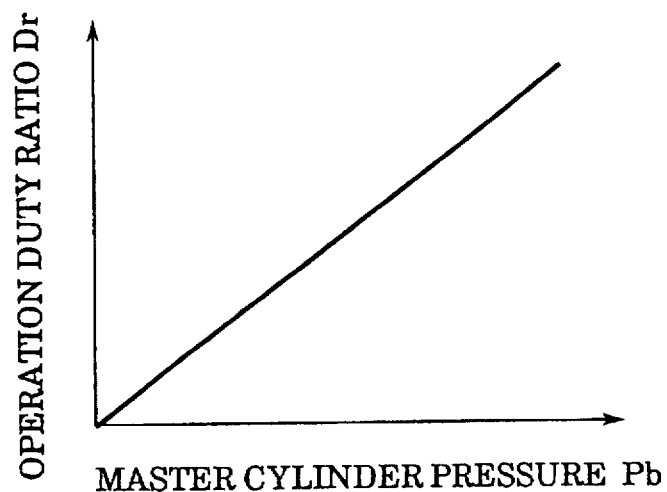
FIG. 5 is a graph showing a relation between master cylinder pressure Pb and drive duty ratio Dr.
Figure 6:
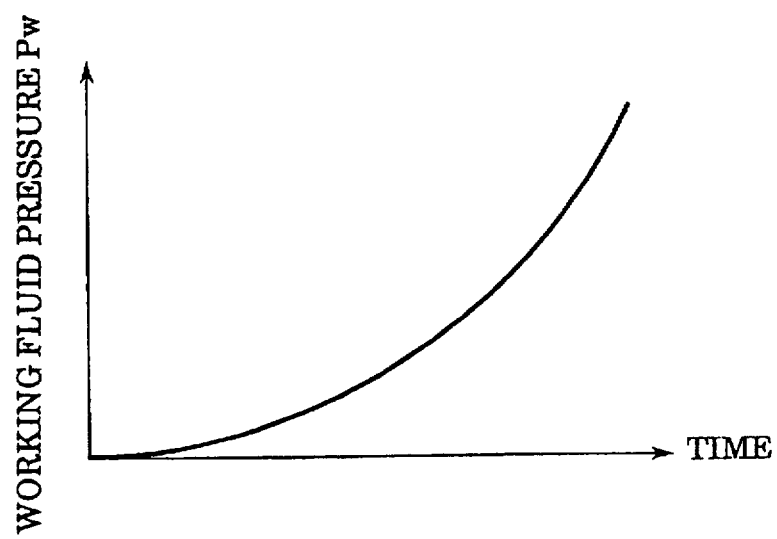
FIG. 6 is a graph showing a relation between time T after the start of operation of the fluid pump and brake pressure Pw.

If the answer of step 70 is yes, the process proceeds to step 90, where the pump 22f is operated, the changeover valve A is opened, the changeover valve B and the control valves E and F are closed, the control valves C and D are on/off controlled according to a duty ratio Dr calculated from a map shown in FIG. 5 based upon a master cylinder fluid pressure Pb, and the flag F1 is set to 1. In step 90, when the master cylinder fluid pressure Pb decreases, the control valve E and F are opened. The control valve C, D, E and F may be on/off controlled in order to accomplish the master cylinder fluid pressure Pb.

In step 100, the pump 22f is operated, the changeover valve A is opened, the changeover valve B is closed, and the flag F1 is set to 1, and then in step 105 a braking force is applied to a front vehicle wheel at the outside of the turn according to the routine shown in FIG. 4 so that the turn behavior of the vehicle is controlled as described hereinbelow.

In step 120, it is tested if the absolute value of the vehicle body slip angle $\beta$ is equal to or greater than the second standard value $\beta2$, and if the answer is yes, the control process proceeds to step 50, whereas if the answer is no, the control process proceeds to step 130, where it is tested if the brake switch 72 is on. If the answer of step 130 is no, the process proceeds to step 140, where the pump 22f is stopped and all changeover valves and control valves are closed, whereas if the answer of step 130 is yes, the control process proceeds to step 150, where the pump 22f is stopped, the changeover valves A and B and the control valves E and F are closed, and the control valves C and D are on/off controlled according to a duty ratio based upon the master cylinder fluid pressure Pb. In this case, since the pump 22f is stopped, if the pressure in the high pressure passage 20f is consumed, it lowers below the master cylinder fluid pressure. In such a case, the master cylinder pressure is introduced into the high pressure passage through the check valve 42f.

In step 160, it is tested if the flag F1 is 1, and if the answer is no, the control process proceeds to step 240, whereas if the answer is yes the control process proceeds to step 170, where it is tested if the count value Cs1 of the counter is equal to or greater than the standard value T1, and if the answer is no, the control process proceeds to step 50, whereas if the answer is yes the control process proceeds to step 180, where it is tested if the brake switch 72 is on. If the answer of step 180 is no, the control process proceeds to step 190, where the pump 22f is stopped, the changeover valve B is opened, and the other changeover valve and the control valves are closed, whereas if the answer of step 180 is yes, the control process proceeds to step 200, where the pump 22f is stopped, the changeover valve B is opened, the changeover valve A and the control valves E and F are closed, and the control valves C and D are on/off controlled according to the duty ratio based upon the master cylinder fluid pressure Pb.

In step 210, the count value Cs1 of the counter is decremented by Ks, while the count value Cs2 of the counter is incremented by 1. In step 220, it is tested if the count value Cs2 of the counter is equal to or greater than a standard value T2 (a positive constant greater than T1), and if the answer is no the process returns to step 10 and the cont value Cs1 and Cs2 of the counters are reset to zero, with the flag F being also reset to zero. If the answer in step 220 is yes, the control process proceeds to step 230, where the pump 22f is stopped, the changeover valve B and the control valves C and D are opened, the changeover valve A and the control valves E and F are closed, and the flag F1 is reset to zero.

The turn behavior control in step 105 will be described with reference to the flowchart of FIG. 4.

First in step 106, the signals indicating vehicle wheel speed Vfl of the front left vehicle wheel and vehicle wheel speed Vfr of the front right vehicle wheel are read in, and then in step 107, the vehicle wheel at the outside of the turn is determined based upon the lateral acceleration Gy of the vehicle body, and then the vehicle wheel speed Vo of the vehicle wheel to which a braking force is applied for the purpose of controlling the behavior is set for the front vehicle wheel positioned at the outside of the turn (called "control vehicle wheel" hereinbelow), then a vehicle wheel speed Vi to be a standard for the calculation of the braking force applied to the control vehicle wheel is determined to be that of a front vehicle wheel at the inside of the turn (called "standard vehicle wheel" hereinbelow), and then in step 108, a target vehicle wheel speed Vt of the control vehicle wheel is calculated according to the below-mentioned formula 1, wherein Sr is a target slip rate (a positive constant).

$$Vt=(1-Sr)*Vi \qquad (1)$$

Although the target slip rate Sr is a predetermined positive constant in the shown embodiment, the target slip rate may be variably determined so as to be greater as the turn behavior of the vehicle gets worse, such that, for example, it is increased along with increase of the absolute value of the vehicle body slip angle β.

In step 109, it is tested if the vehicle wheel speed deviation Vo−Vt of the control vehicle wheel is greater than a standard value a (a positive constant), and if the answer is no, the control process proceeds to step 113, whereas if the answer is yes the control process proceeds to step 110, where it is tested if the flag F is 1. If the answer of step 110 is no, then in step 111 the control valve E or F of the control vehicle wheel is closed and the control valve C or D of the control vehicle wheel is on/off controlled according to the duty ratio Dr determined based upon a lapse time T indicated by the count number Cs1 of the counter according to the below-mentioned Table 1, so that thereby the braking force of the control vehicle wheel is increased. On the other hand, if the answer of step 110 is yes, then in step 112 the control valve E or F of the control vehicle wheel is closed, and the control valve C or D of the control vehicle wheel is on/off controlled according to the duty ratio Dr2 of the section (3) in the below-mentioned Table 1, so that thereby the braking force of the control vehicle wheel is increased.

In this connection, in the below-mentioned Table 1, the lapse time T is the time lapsed from the time point of the start of operation of the pump 22f, and the duty ratio Dr1 is a value such as, for example, 75% which is smaller than 100% and greater than Dr2.

TABLE 1

| Section | Lapse time | Duty ratio Dr |
| --- | --- | --- |
| (1) | 0 < T ≦ T2 | 100% |
| (2) | T2 < T ≦ T3 | Dr1 |
| (3) | T3 < T | Dr2 |

In step 113, it is tested if the vehicle wheel speed deviation Vo−Vt of the control vehicle wheel is smaller than a standard value minus −b (constant), and if the answer is yes, then in step 114 the control valve C or D of the control vehicle wheel is closed, and the control valve E or F of the control vehicle wheel is on/off controlled according to a predetermined duty ratio Dr, so that thereby the braking force of the control vehicle wheel is decreased. If the answer of step 113 is no, then in step 115 the control valve E or F of the control vehicle wheel is closed, and the control valve C or D of the control vehicle wheel is closed, so that the braking force of the control vehicle wheel is maintained. In step 116 the flag F is set to 1.

In this first embodiment, in the normal driving condition of the vehicle where the vehicle body slip angle β is substantially zero, the control process proceeds through steps 10, 20, 30 and 160, and in step 160 the answer of testing is no, so that the control process proceeds to step 240, where the changeover valves and the control valves are maintained at the positions shown in FIG. 1, whereby the vehicle remains in the condition that the braking forces applied to the front left and right vehicle wheels are controlled according to the stepping on of the brake pedal 12 by the driver.

When the turn behavior of the vehicle becomes unstable so that the absolute value of the vehicle body slip angle β is not less than the standard value β1, the answer of step 30 turns into yes. However, since for the time being the count value Cs1 is not greater than the standard value T1, the answer of step 40 is no, and therefore step 50 is executed, and then in step 60 the answer of testing is no. When no braking action is done by the driver, in step 70 the answer of testing is no, and therefore step 80 is executed, whereby the pressure in the high pressure passage 20f is raised by the pump 22f, preparing for an automatic braking for the behavior control.

When the driver does a braking action in a condition where the turn behavior of the vehicle has started to be unstable, in step 70 the answer of step 70 is yes, and therefore step 90 is executed, whereby the high pressure passage 20f is pressurized by the pump 22f, while the braking forces of the front left and right vehicle wheels are controlled according to the master cylinder pressure Pb.

Figure 7:
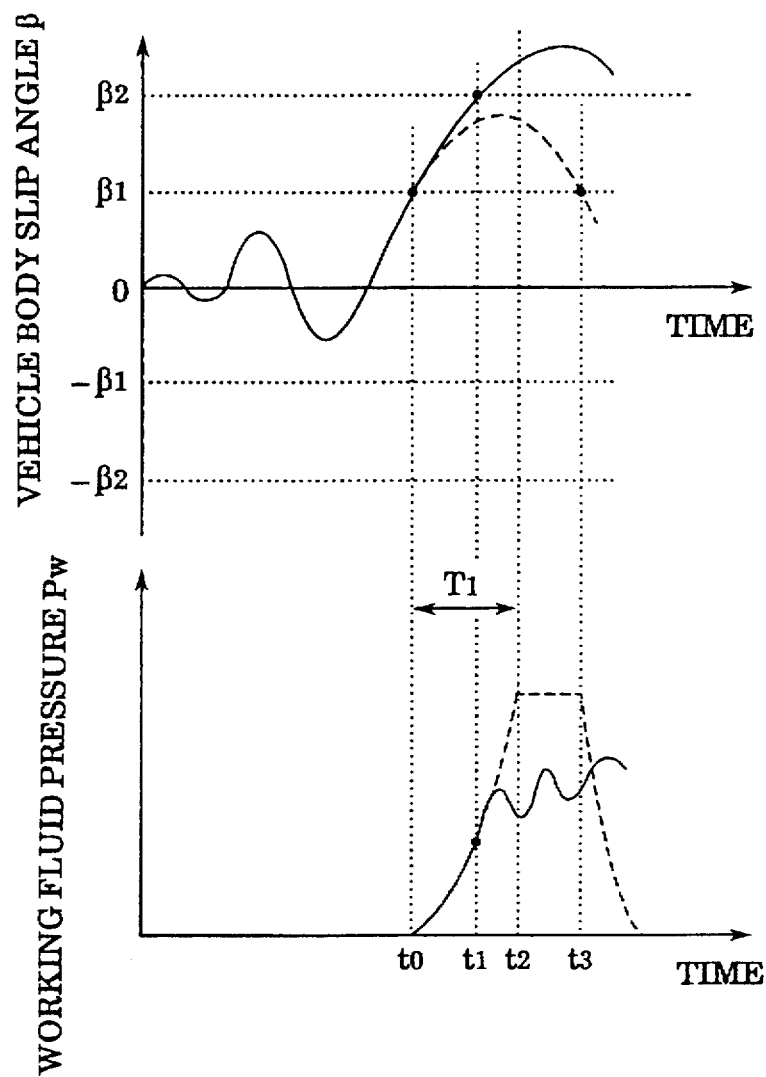
FIG. 7 is a time chart showing an example of changes of vehicle body slip angle beta and working fluid pressure Pw.

In the following, several cases of control will be described:

(1) A case such as shown by the solid line curve in FIG. 7: It is assumed that the behavior control of the vehicle is started at a time point t1 which is delayed from a time point t0 at which the pump is started and which is before a time point t2 which is delayed from the time point t0 by a time duration T1, as shown by the solid line curve in FIG. 7. In this case, the answer of step 30 is yes, and the answer of step 40 is no for the time being, and step 50 is executed. At time point t2, the answer of step 60 turns into yes, and then step 100 is executed, and thereafter, in step 105 the braking force is controlled such that the deviation between the vehicle wheel speed Vo of the control vehicle wheel (the front vehicle wheel at the outside of the turn) and the target vehicle wheel speed Vt is between −b and a, by the execution of the turn behavior control.

At the beginning of the behavior control, the vehicle wheel speed deviation is greater than the standard value a, and therefore, the answer of step 109 is yes, and since flag F is first zero, the answer of step 110 is no, and therefore, step 111 is executed such that the control valve C or D of the control vehicle wheel are on-off controlled according to a varying duty ratio such as shown in Table 1 based upon the count value Cs1, i.e. the lapse of time, so that the pressure of the wheel cylinder 54fl or 54fr of the control vehicle wheel is increased at a greater uprising gradient as the lapsed time T from the time point t0 is smaller, whereby the pressure in the high pressure passage 20f is quickly increased.

When the pressure uprising has started, the vehicle wheel speed of the control vehicle wheel lowers so that the vehicle wheel speed deviation Vo–Vt soon lowers below the standard value a, whereupon the answer of step 109 turns to no. When the vehicle wheel speed deviation Vo–Vt is greater than the negative standard value –b, the answer of step 113 is no, so that step 115 is executed to maintain the pressure in the wheel cylinder of the control vehicle wheel unchanged. When the vehicle wheel speed of the control vehicle wheel further lowers such that the vehicle wheel speed deviation Vo–Vt becomes smaller than the negative standard value –b, then the answer of step 113 turns into yes, and then step 114 is executed to decrease the pressure in the wheel cylinder of the control vehicle wheel.

When the pressure in the wheel cylinder of the control vehicle wheel is decreased, the vehicle wheel speed of the control vehicle wheel is recovered so far that the answer of step 109 turns into yes. At this time, since the flag F is already set to 1 through step 116, the answer of step 110 is yes, and therefore, now step 112 is executed so as to moderately increase the braking force of the control vehicle wheel.

Figure 4:
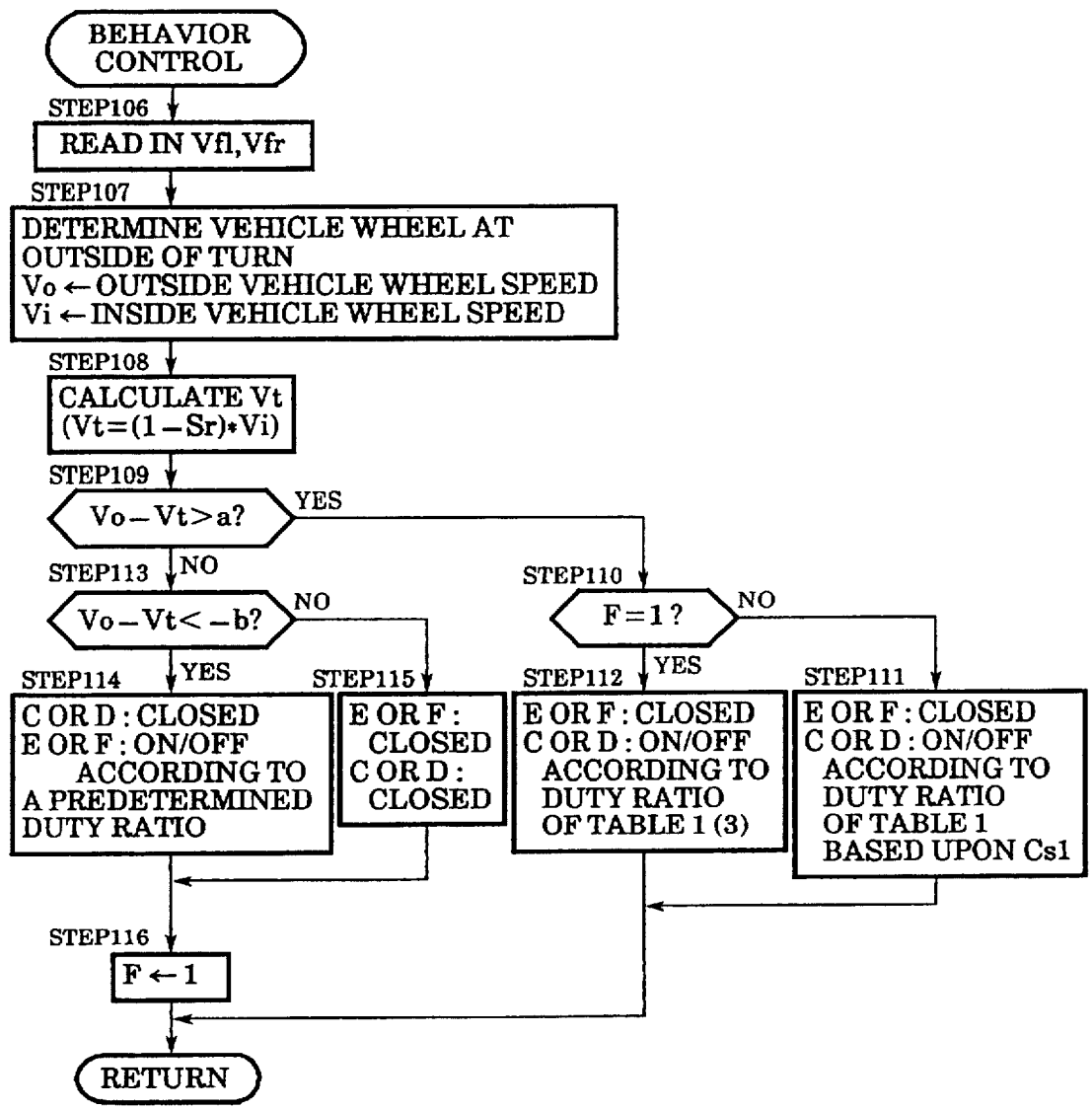
FIG. 4 is a flowchart showing a behavior control routine in the first embodiment.

The behavior control described above, i.e. the control according to the routine shown in FIG. 4, is continued until it is tested that the behavior of the vehicle has stabilized such that the absolute value of the vehicle value slip angle β is not greater than the second standard value β2.

(2) A case such as shown by a dot line curve in FIG. 7: When the vehicle body slip angle β continues to be greater than β1 but smaller than β2 beyond the time T1, i.e., the answers of steps 30 and 40 are yes but the answer of step 120 is no, it is tested in step 130 if the driver is doing a braking action. If the answer of step 130 is no, then in step 140 the pump 22f is stopped, and all changeover valves and control valves are closed such that the pressure in the high pressure passage 20f is maintained at the high pressure. When the answer of step 130 is yes, then in step 150, the pump 22f is stopped, and the braking forces of the front left and right vehicle wheels are controlled according to the master cylinder pressure Pb in the working fluid pressure control passage 16f, i.e. according to the stepping on of the brake pedal 12 by the driver.

(3) When the absolute value of the vehicle body slip angle β becomes smaller than β1 after the start of operation of the pump, the answer of step 30 is no, and therefore the control process proceeds to step 160. Since the flag F1 is already set to 1 as the pump 22f was once started, the control process proceeds to step 170. Until the time T1 lapses from the start of the pump, the answer of step 170 is no, and therefore the control process proceeds through steps 50, 60 and 70 and then 80 or 90, with pump 22f being operated.

When the time T1 lapses, the answer of step 170 turns into yes, and if the driver is doing no braking action, the answer of step 180 is no. Then in step 190, the pump 22f is stopped and the changeover valve B is opened, with the other valves being closed, so that the pressure in the high pressure passage 20f is decreased.

If the driver is doing a braking action, the answer of step 180 is yes, and then in step 200, the pump 22f is stopped so that the pressure in the high pressure passage 20f lowers, while the pressure in the wheel cylinders of the front left and right vehicle wheels is controlled according to the pressure Pb in the working fluid pressure control passage 16f. If under this condition the pressure in the high pressure passage 20f would lower than the pressure Pb in the working fluid pressure control passage 16f, the working fluid in the passage 16f is supplied to the wheel cylinders of the front left and right vehicle wheels through the check valve 42f, so that in any event it is ensured that the braking forces applied to the front left and right vehicle wheels are placed under the control of the brake pedal by the driver.

Further, with the decrease of the pressure of the high pressure passage 20f through step 190 or 200, in step 210 the count value Cs1 is decremented by Ks. Therefore, when it happens that, after a duration of the condition that β is smaller than β1, and thereafter β increases so much that the answer of step 30 turns into yes and thereby the pump 22f is started in step 80 or 90, the count value Cs1 to be incremented in step 50 reflects the pressure in the high pressure passage 20f to be pressurized by the pump 22f. Therefore, the pressure uprising gradient during the increase of the pressure at the first control cycle executed in the behavior control step 111 is adapted to the actual pressure in the high pressure passage 20f.

The solid line curves of FIG. 7 show an example of the changes of the vehicle body slip angle β and the working fluid pressure Pw (the pressure in the high pressure passage 20f) in the case that the behavior control is started before the time T1 lapses from the time point of starting operation of the pump 22f, while the dot line curves show an example of the changes of the vehicle body slip angle β and the working fluid pressure Pw in the case that, after the start of operation of the pump, there continues a condition that the vehicle body slip angle β is greater than the first standard value β1 but no behavior control is executed even after the lapse of T1.

As will be appreciated from the above descriptions, according to the first embodiment, when the turn behavior of the vehicle begins to deteriorate, at first the fluid pump 22 is started to operate so as to increase the pressure in the high pressure passage 20f to a sufficient pressure, and thereafter the braking pressure at the control vehicle wheel is increased to a controlled pressure. Therefore, even when no high pressure working fluid reservoir is provided, the behavior control of the vehicle is effectively accomplished by a difference of the braking force between the front left and front right vehicle wheels.

Figure 8:
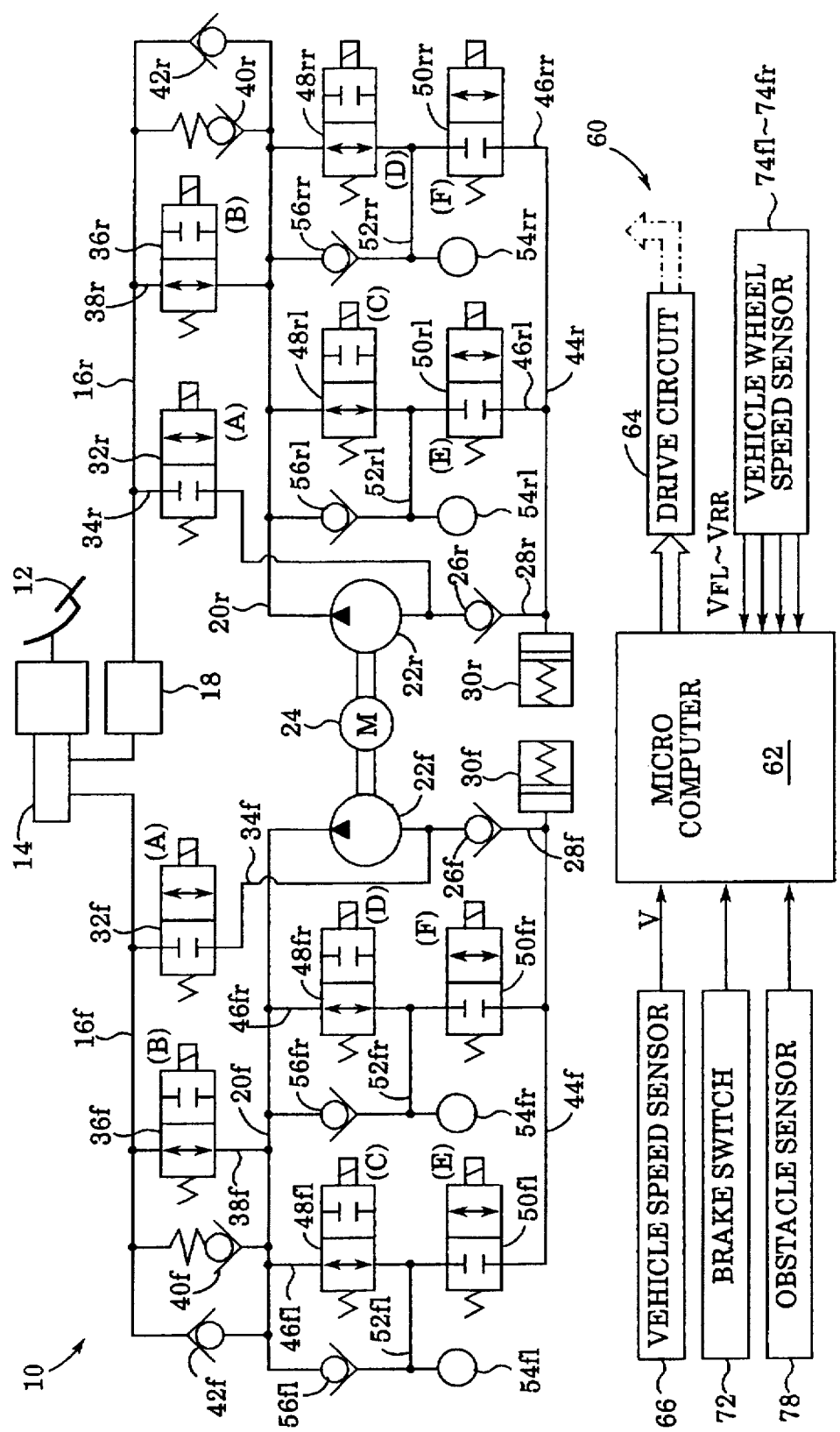
FIG. 8 is a diagrammatical view showing a fluid hydraulic circuit and an electric control means of a second embodiment of the brake system according to the present invention.

FIG. 8 is a diagrammatical view showing a fluid hydraulic circuit and an electrical control means of a second embodiment of the brake system according to the present invention. In FIG. 8, the portions corresponding to those shown in FIG. 1 are designated by the same reference numerals.

In this second embodiment, the pumps 22f and 22r are driven by a common electric motor 24. Further, in this embodiment, the microcomputer is supplied with a signal indicating vehicle speed V from a vehicle speed sensor 66, a signal indicating stepping on of the brake pedal rom the brake switch 72, signals indicating vehicle wheel speed of front left and right vehicle wheels and rear left and right vehicle wheels from vehicle wheel speed sensors 74fl–74rr, and a signal indicating whether there is an obstacle in front of the vehicle within a distance D from an obstacle sensor 78. The obstacle sensor 78 may be constructed, for example, to eject a supersonic wave or an electromagnetic wave in the forward direction and to detect a reflected wave, so as to detect existence of an obstacle and the distance thereto.

Figure 9:
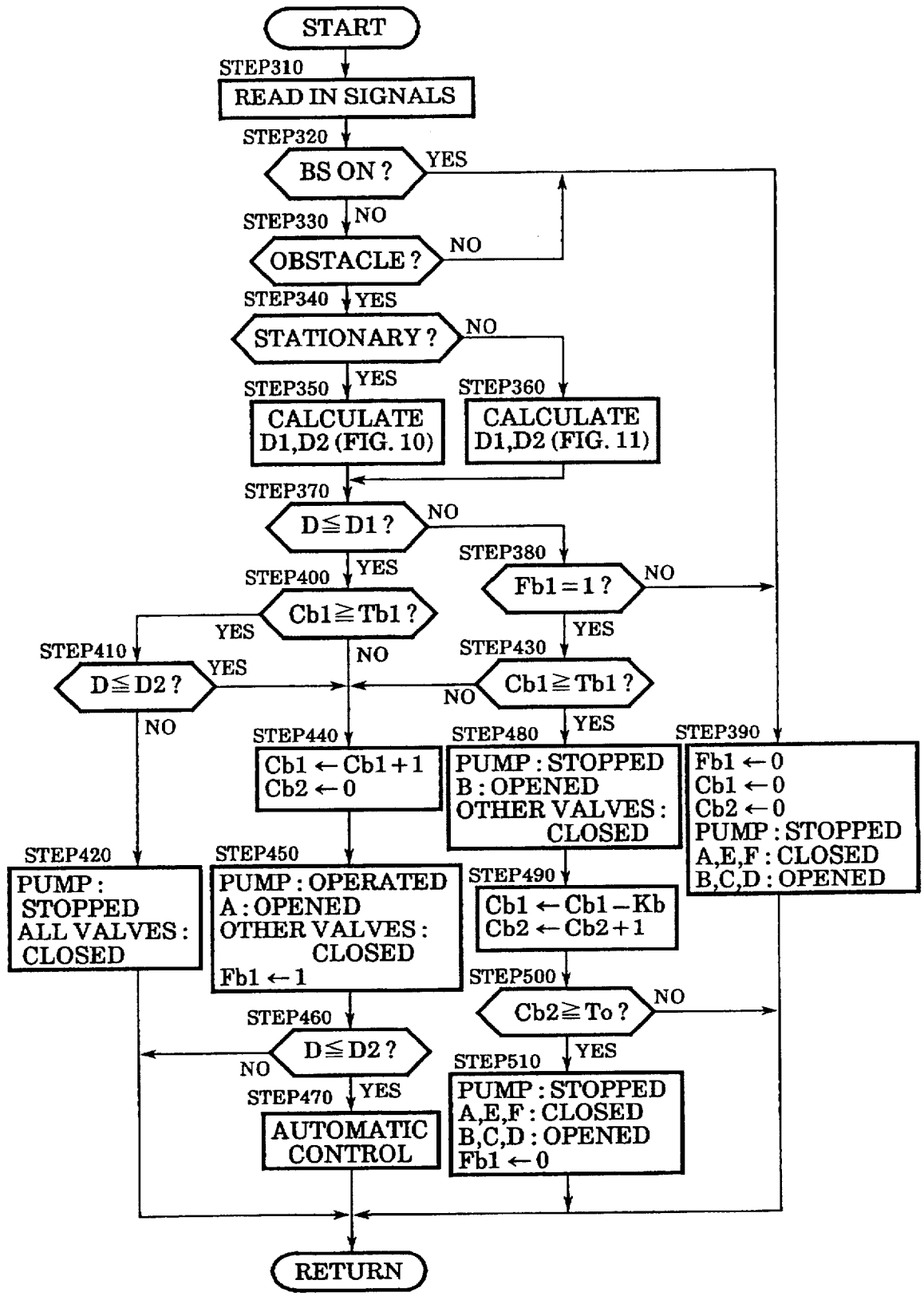
FIG. 9 is a flowchart showing a braking force control routine of the second embodiment.

The brake control of the vehicle according to the second embodiment of the invention will be described with reference to the flowchart of FIG. 9. The control according to the flowchart of FIG. 9 is also started by the closing of an ignition switch not shown in the figure and cyclically repeated at a predetermined cycle time. Prior to the execution of step 310 the system is initialized such that flag Fb1 is reset to zero and count values Cb1 and Cb2 of counters are also reset to zero.

In the following descriptions of this second embodiment, for the purpose of convenience and simplicity, the changeover valves 32f and 32r for the front and rear vehicle wheels are called changeover valve A, the changeover valves 36f and 36r for the front and rear vehicle wheels are called changeover valve B, the control valves 48fl and 48rl are called control valve C, the control valves 48fr and 48rr are called control valve D, the control valves 50fl and 50rl are called control valve E, and the control valves 50fr and 50rr are called control valve F.

First in step 310, the signal indicating vehicle speed V detected by the vehicle speed sensor 66 and other signals are read in, and then in step 320 it is tested if the brake switch 72 is on, and if the answer is yes, the control process proceeds to step 390, whereas if the answer is no, the control process proceeds to step 330, where it is tested if any obstacle is detected by the obstacle sensor 78. If the answer of step 330 is no, the control process proceeds to step 390, whereas if the answer is yes, the control process proceeds to step 340.

Figure 10:
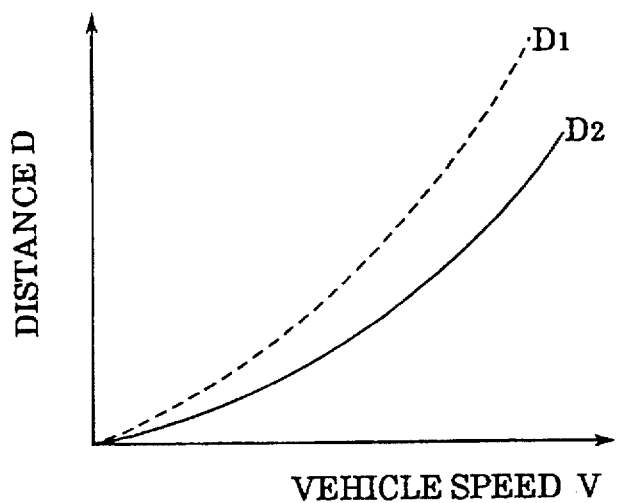
FIG. 10 is a graph showing a relation between vehicle speed V and standard values D1 and D2 when an obstacle is stationary.
Figure 11:
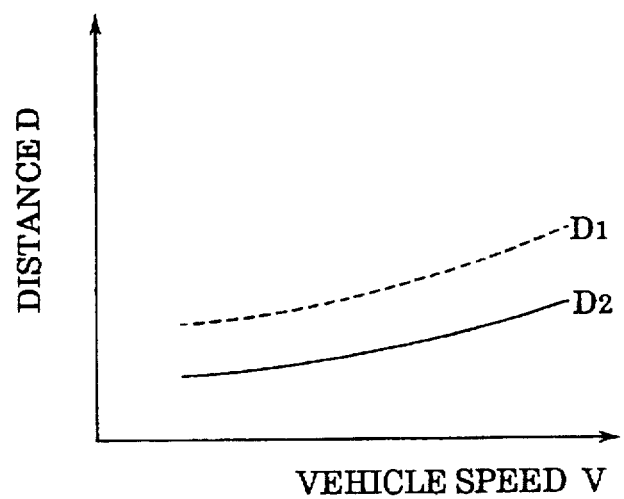
FIG. 11 is a graph showing a relation between vehicle speed V and standard value D1 and D2 when an obstacle is a driving vehicle.

In step 340, it is tested if the obstacle is a stationary object such as a stopped vehicle, a fallen load or a large fallen stone, based upon, for example, a comparison between a differentiated value of the distance D to the obstacle detected by the obstacle sensor and the vehicle speed V, and when the answer is yes, then in step 350 standard values D1 and D2 are calculated based upon the map shown in FIG. 10, whereas if the answer is no, then in step 360 standard values D1 and D2 are calculated based upon the map shown in FIG. 11. Then in step 370 it is tested if the distance D to the obstacle is smaller than the standard value D1, and if the answer is yes, the control process proceeds to step 400, whereas if the answer is no, the control process proceeds to step 380.

In step 380, it is tested if flag Fb1 is 1, and if the answer is no, the control process proceeds to step 390, where flag Fb1 is reset to zero, count values Cb1 and Cb2 of the counters are reset to zero, the pumps 22f and 22r are stopped, the changeover valves A and the control valves E and F are closed, the changeover valves B and the control valves C and D are opened, so that thereby the braking pressures of the respective wheels cylinders are controlled based upon the master cylinder pressure Pd according to the stepping on of the brake pedal 12 by the driver.

In step 400, it is tested if the count value Cb1 of the counter is equal to or greater than a standard value Tb1 (a positive constant), and if the answer is yes, the control process proceeds to step 410, where it is tested if the distance D to the obstacle is not greater than the standard value D2 (a positive constant smaller than D1), and if the answer is yes, the control process proceeds to step 440, whereas if the answer is no the control process proceeds to step 420, where the pumps 22f and 22r are stopped and all changeover valves and control valves are closed.

In step 430, in the same manner as in step 400, it is tested if the count value Cb1 of the counter is equal to or greater than the standard value Tb1, and if the answer is yes, the control process proceeds to step 480, whereas if the answer is no, the control process proceeds to step 440, where the count value Cb1 is incremented by 1, while the count value Cb2 is reset to zero, and then in step 450, the pumps 22f and 22r are operated, the changeover valves A are opened, other changeover valves and control valves are closed, and flag Fb1 is set to 1. Then in step 460, it is tested if the distance D to the obstacle is equal to or smaller than the standard value D2, and if the answer is no, the control process returns to step 310, whereas if the answer is yes, the control process proceeds to step 470, where the automatic brake control is executed.

The automatic brake control is executed in such a manner that the braking force is increased quickly in an initial stage by the control valves C and D being opened, while the control valves E and F are closed, and if the vehicle wheels show a locking tendency by such an initial quick braking, an ABS (anti-lock brake system) control is executed by controlling the braking force at the respective vehicle wheels according to on/off control of the control valves C–F so as thereby to maintain the slip rate of the vehicle wheels below a predetermined limit value.

In step 480, the pumps 22f and 22r are stopped, the changeover valves B are opened, and other changeover valves and control valves are closed, and then in step 490 the count value Cb1 is decremented by Kb (a positive constant), while the count value Cb2 is incremented by 1. Then in step 500, it is tested if the count value Cb2 is equal to or greater than a standard value To (a positive constant), and if the answer is no, the control process returns to step 310, whereas if the answer is yes, the control process proceeds to step 510, where the pumps 22f and 22r are stopped, changeover valves A and the control valves E and F are closed, the changeover valve B and the control valves C and D are opened, and the flag Fb1 is reset to zero.

In this second embodiment, in the normal driving condition where no obstacle exists in front of the vehicle, the answer of the testing of step 330 is no, and therefore the control process proceeds to step 390, whereby the braking force at each vehicle wheel is controlled by the master cylinder pressure Bb according to the stepping on of the brake pedal 12 by the driver. In this case, since step 320 is executed prior to step 330, when the driver does a braking action, the driver's braking action has the priority over the automatic braking operation by the brake system.

When an obstacle exists in front of the vehicle and is detected by the obstacle sensor 78, in step 330 the answer is yes, and in step 340 it is tested if the obstacle is stationary, and then in step 350 or 360 the first standard value D1 and the second standard value D2 are calculated according to the vehicle speed V such that these standard values are greater when the obstacle is stationary than when the obstacle is a vehicle driving ahead. When an obstacle exists in front of the vehicle, normally the distance D to the obstacle, when first detected, is greater than the standard value D1, and therefore the answers of steps 370 and 380 are no, and therefore step 390 is executed so that the braking force at each vehicle wheel is placed under the control of the master cylinder pressure Pb according to the stepping on of the brake pedal 12 by the driver.

When the distance D to the obstacle decreases to be smaller than the first standard value D1, the answer of step 370 turns into yes, and since in an early stage the answer of 400 is no, steps 440 and 450 are executed such that the pumps 22f and 22r are operated, starting to raise the pressure in the high pressure passages 20f and 20r, while the answer of step 460 remains no.

When the distance D to the obstacle further decreases to the second standard value D2, the answer of step 460 turns into yes, and then step 470 is executed so that the automatic braking is carried out so as to apply the braking force to the front left and right vehicle wheels and the rear left and right vehicle wheels to automatically prevent a collision of the vehicle to the obstacle.

When the condition that the distance D to the obstacle is smaller than the first standard value D1 but is equal to or greater than the second standard value D2 continues, there can occur a condition that the answer of step 400 has turned into yes but the answer of step 410 is still no. In this case, step 420 is executed so that the pumps 22f and 22r are stopped, and all valves are closed, so that the pressure in the high pressure passages 20f and 20r and the pressures in the wheel cylinders of the respective vehicle wheels are maintained as unchanged.

When the distance D to the obstacle increases not to be smaller than the first standard value D1, the answer of step 370 turns into no, but since the flag Fb1 is already set to 1 when the pumps was once started, the answer of step 380 is yes. When the predetermined time Tb1 has not yet lapsed from the time point of starting operation of the pumps 22f and 22r, the answer of step 430 is no, and therefore steps 440 and 450 are executed, so that until the predetermined time Tb1 lapses, the pumps 22f and 22r are operated. When the predetermined time Tb1 has lapsed, steps 480 and 490 are executed so that the pumps 22f and 22r are stopped, and the pressure in the high pressure passages 20f and 20r lowers.

Figure 12:
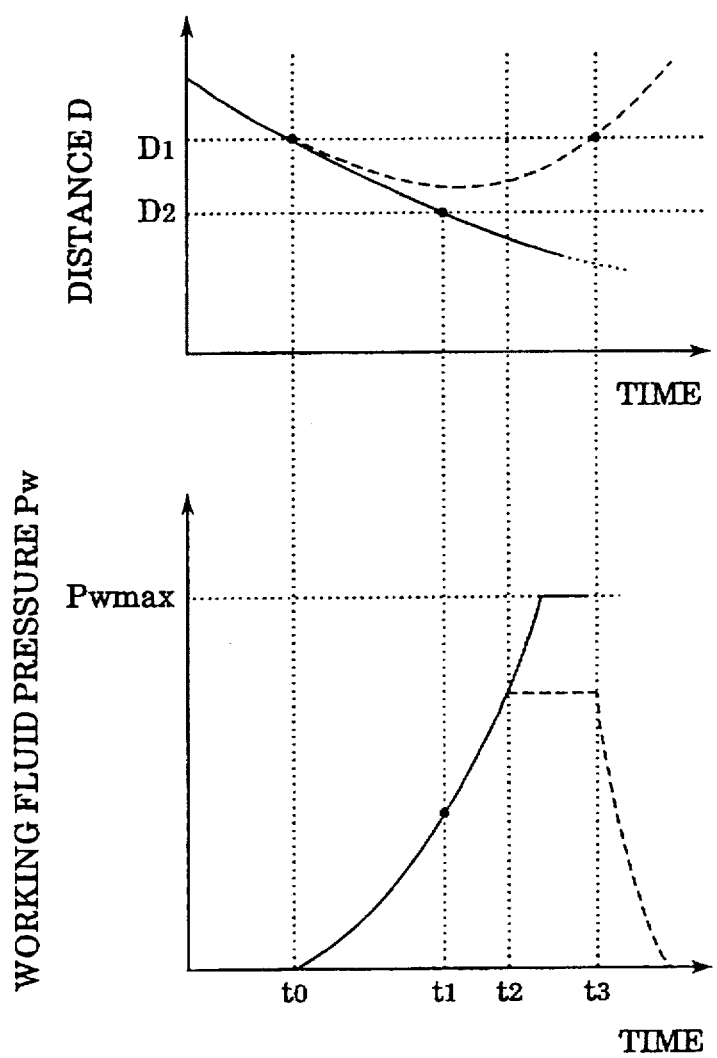
FIG. 12 is a time chart showing an example of changes of vehicle body slip angle beta and working fluid pressure Pw.

In FIG. 12, the curves by solid lines show an example of the changes of the distance D and the working fluid pressure Pw (the pressure in the high pressure passages 20f and 20r) in the case that the automatic braking is started before the time Tb1 lapses from the start of operation of the pumps 22f and 22r, and the dot lines show an example of changes of the distance D and the working fluid pressure Pw in a case that the operation of the pumps is started with the distance D traversing the first limit D1 but the distance D is recovered without traversing the second limit D2.

As will be appreciated from the above descriptions, according to the second embodiment, when an obstacle is detected in front of the vehicle, first the fluid pumps 22f and 22r are started to raise the pressure in the high pressure passages 20f and 20r to a pressure sufficiently high to operate the brake system, and thereafter the braking force at each vehicle wheel is increased. Therefore, the vehicle is definitely braked at a high responsiveness, requiring no accumulator for storing a high pressure working fluid.

Figure 13:
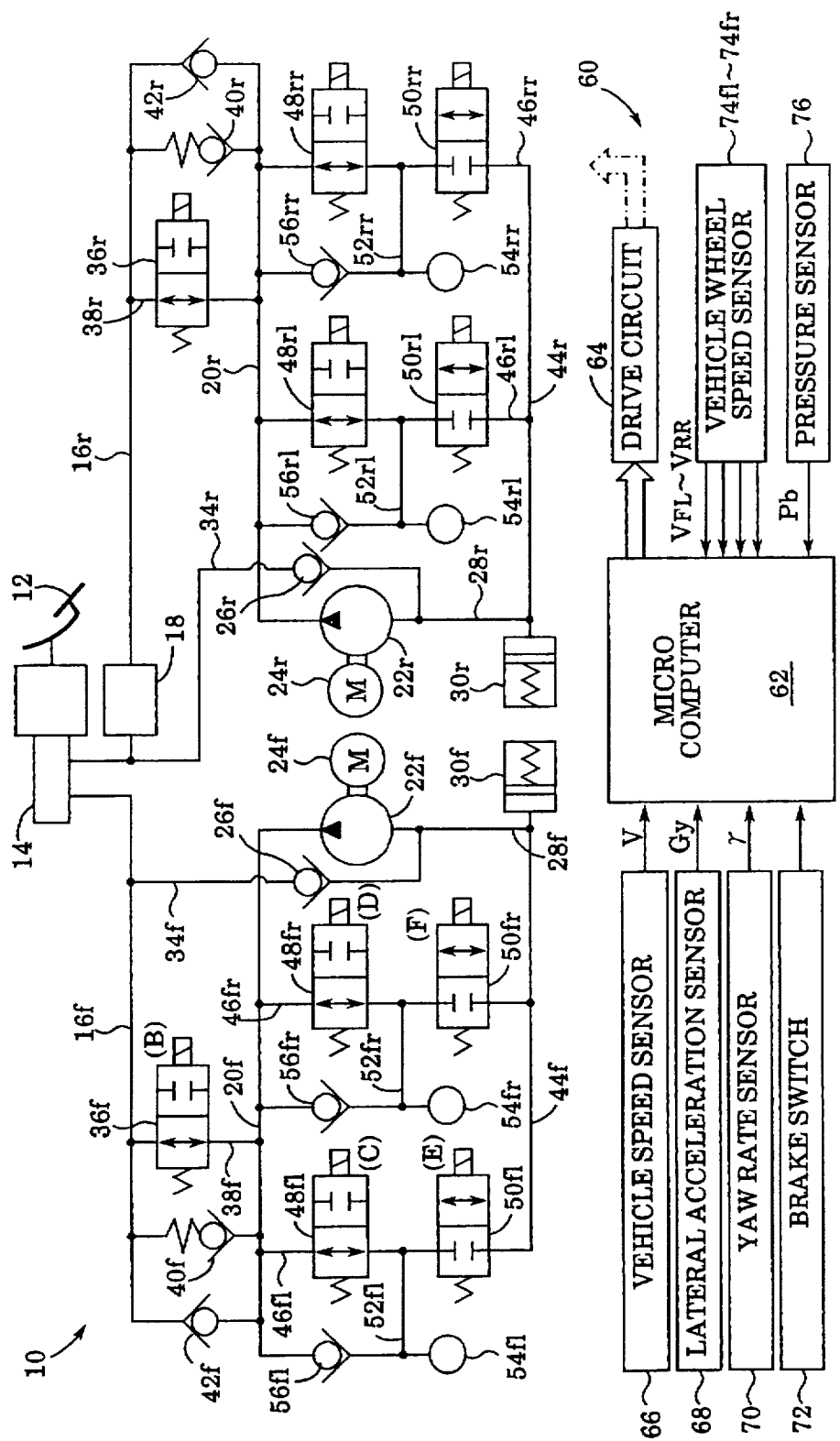
FIG. 13 is a diagrammatical view showing a fluid hydraulic circuit and an electrical control means of the third embodiment of the brake system according to the present invention.

FIG. 13 is a diagrammatical view showing a fluid hydraulic circuit and an electrical control means of a third embodiment of the brake system according to the present invention. In FIG. 13, the portions corresponding to those shown in FIG. 1 are designated by the same reference numerals.

In this third embodiment, the changeover valves 32f and 32r in the first embodiment are omitted, and instead the check valves 26f and 26r are provided in the passages 34f and 34r, instead of being provided in the supply passages 28f and 28r. Further, although not shown in detail in the figure, each of the pumps 22f and 22r incorporates a relief valve so that the delivery pressure does not exceed a predetermined pressure value. Except the above modifications, the fluid hydraulic circuit of this embodiment is the same as the fluid hydraulic circuit of the first embodiment.

Figure 14:
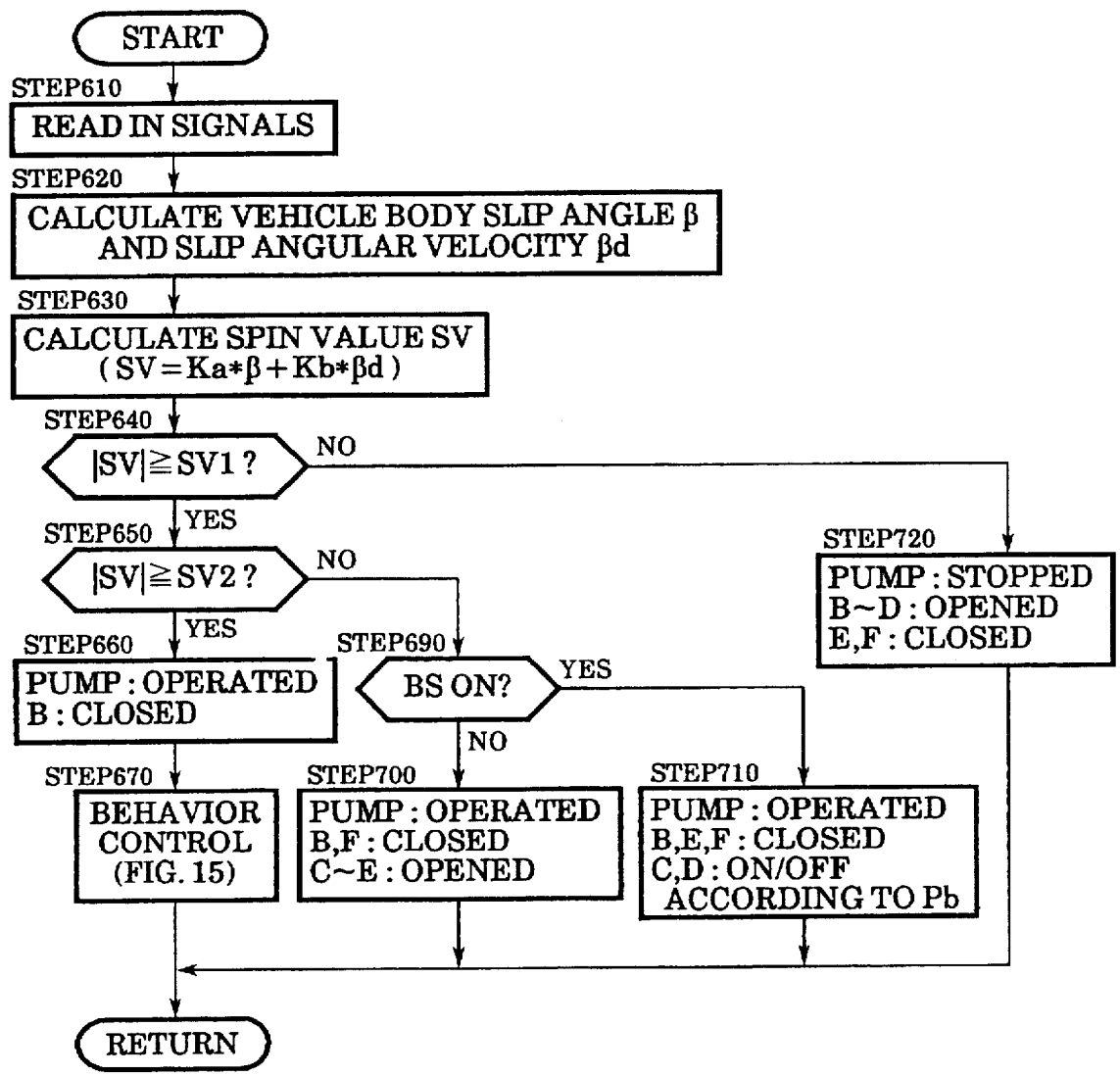
FIG. 14 is a flowchart showing a braking force control routine of the third embodiment.

Referring to the flowcharts of FIGS. 14 and 15, the braking control of the vehicle according to the third embodiment will be described. The flowchart shown in FIG. 14 is also started by closing an ignition switch not shown in the figure and is cyclically repeated with a predetermined cycle time.

First in step 610, a signal indicating vehicle speed V detected by the vehicle speed sensor 66 and other signals are read in, and then in step 620 there are calculated a lateral acceleration deviation as a difference Gy−V* r between lateral acceleration Gy and a product V*r of vehicle speed V and yaw rate r, i.e. side slide acceleration Vyd of the vehicle body, side slide velocity Vy of the vehicle body by integrating the side slide acceleration Vyd, slip angle β of the vehicle as a ratio Vy/Vx of the side slide velocity Vy of the vehicle body to longitudinal velocity Vx of the vehicle body (=vehicle speed V), and slip angle velocity βd of the vehicle as a differentiation of the vehicle body slip angle β. In step 630, spin value SV as a sum Ka*β+Kb*βd based upon the slip angle β and the slip angle velocity βd, wherein Ka and Kb are positive constants.

In step 640, it is tested if the absolute value of the spin value SV is equal to or greater than a first standard value VS1 (a positive constant), and when the answer is no, the control process proceeds to step 720, whereas when the answer is yes, the control process proceeds to step 650, where it is tested if the absolute value of the spin value SV is equal to or greater than a second standard value SV2 (a positive constant greater than SV1). When the answer of step 650 is yes, the control process proceeds to step 660, where the pump 22f is operated, while the changeover valve B is closed, and then in step 670 a behavior control is executed according to the routine shown in FIG. 15.

When the answer of step 650 is no, then in step 690 it is tested if the brake switch 72 is on, i.e. if the driver is doing a braking action. When the answer of step 690 is no, then in step 700 the pump 22f is operated, the changeover valve B and the control valve F are closed, and the control valves C–E are opened. When the answer of step 690 is yes, then in step 710 the pump 22f is operated, the changeover valve B and the control valves E and F are closed, and the control valves C and D are on/off controlled based upon the duty ratio Dr according to the master cylinder fluid pressure Pb. In step 720, the pump 22f is stopped, the changeover valve B and the control valves C and D are opened, and the control valves E and F are closed. In this connection, when, in step 710, the master cylinder fluid pressure Pb lowers, the control valves E and F are opened. The control valves C, D, E and F may be on/off controlled in order to attain the master cylinder fluid pressure Pb.

Figure 15:
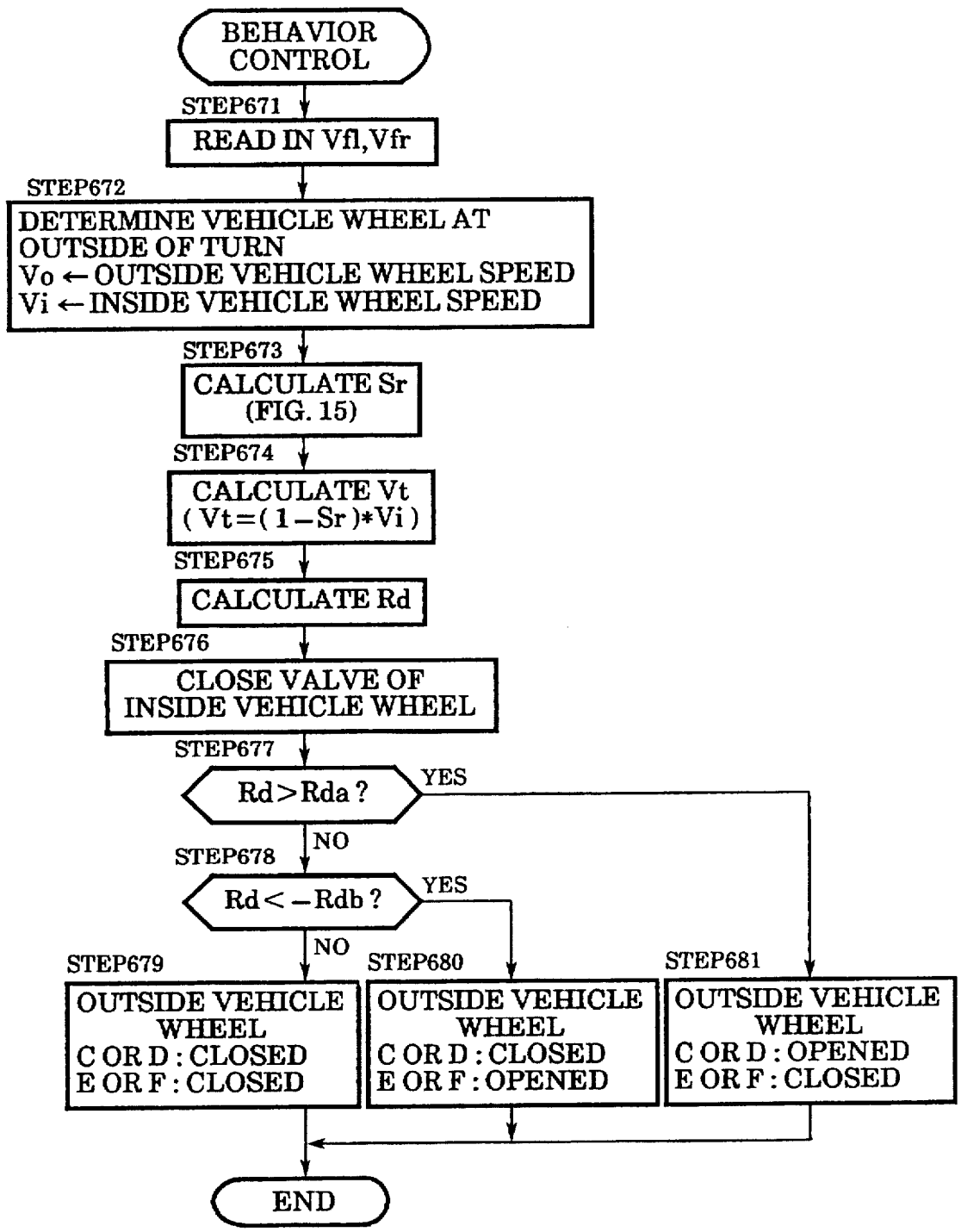
FIG. 15 is a flowchart showing a behavior control routine in the third embodiment.
Figure 16:
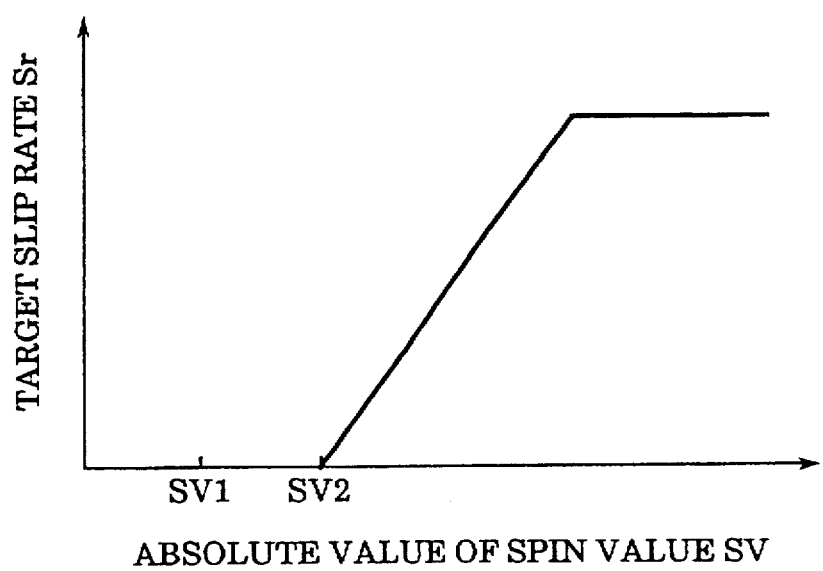
FIG. 16 is a graph showing a relation between the absolute value of spin value SV and target slip rate Sr.

Steps 671 and 672 of the behavior control routine of FIG. 15 are executed in the same manner as those in the first embodiment, and in step 673 a target slip rate Sr of a front vehicle wheel at the outside of the turn is calculated based upon the absolute value of the spin value SV according to the map of FIG. 16, and then in step 674 a target vehicle wheel speed Vt of the front vehicle wheel at the outside of the turn is calculated according to the below-mentioned formula 2, wherein Vi is a vehicle wheel speed of a front vehicle wheel at the inside of the turn, and then in step 675 the duty ratio Rd is calculated according to the below-mentioned formula 3, wherein Vo is the vehicle wheel speed of the front vehicle wheel at the outside of the turn, and Kp and Kd are constant coefficients of the proportional term and the differentiation term of the feedback control of the vehicle wheel speed.

$$Vt=(1-Sr)*Vi \quad (2)$$

$$Rd=Kp*(Vo-Vt)+Kd*d(Vo-Vt)/dt \quad (3)$$

In step 676, the control valves C and E or D and F of the front vehicle wheel at the outside of the turn are closed, and then in step 677 it is tested if the duty ratio Rd is greater than a standard value Rda (a positive constant). If the answer is yes, the control process proceeds to step 681, whereas if the answer is no the control process proceeds to step 678 and it is tested if the duty ratio Rd is smaller than a standard value −Rdb (a negative constant). If the answer is no, then in step 679 the control valve C or D of the front vehicle wheel at the outside of the turn is closed and the control valve E or F is also closed. In step 680, the control valve C or D of the front vehicle wheel at the outside of the turn is closed, while the control valve E or F is opened. In step 681, the control valve C or D of the front vehicle wheel at the outside of the turn is opened, while the control valve E or F is closed.

Thus in this third embodiment, in the normal driving condition where the spin value SV is substantially zero, the answer of step 640 is no, and therefore step 720 is executed such that the respective changeover valves and control valves are maintained in the positions shown in FIG. 13, and the braking forces of the front left and right vehicle wheels are placed under the stepping on of the brake pedal 12 by the driver.

When the behavior of the vehicle becomes so unstable that the absolute value of the spin value SV becomes equal to or greater than the first standard SV1, the answer of step 640 turns into yes, but then in step 650 the answer will still be no. Therefore, the control process proceeds to step 690. When the brake is being operated by the driver, the answer of step 690 is yes, and therefore in step 710 the pressure in the high pressure passage 20f is pressurized by the pump 22f, and further the braking forces of the front left and right vehicle wheels will be controlled according to the master cylinder pressure Pb in the working fluid pressure control passage 16f.

In contrast, if the driver is doing no braking action, in step 690 the answer is no, and then in step 700 the pump 22f is operated with the changeover valve B and the control valve F being closed, while the control valves C-E are opened, whereby the fluid is circulated through the high pressure passage 20f, passage 46fl and passage 44f, whereby the pressure in the passages 52fl and 52fr increases, whereby the wheel cylinders 54fl and 54fr of the front left and right vehicle wheels are supplied with the working fluid at a predetermined pressure to be ready for the automatic braking.

When the turn behavior of the vehicle becomes further unstable so that the absolute value of the spin value SV becomes to be equal to or greater than the second standard value SV2, the answer of step 650 turns into yes, and therefore in step 660 the pump 22f is operated, with the changeover valve B being closed, and then in step 670 the front vehicle wheel at the outside of the turn is given a braking force according to the behavior control routine shown in FIG. 15 so that the vehicle is given an anti-spin moment to recover the stability of turn behavior.

Although in the third embodiment the changeover valve B and the control valve F are closed while the control valves C-E are opened, the pump 22f being operated, to circulate the working fluid when the automatic braking for the behavior control is expected, the control valve E may be closed while the control valve F is opened. In other words, either one of the control valves E and F is closed so that one of the passages for conducting the working fluid delivered by the pump 22f to the reservoir 30f is blocked, so that thereby a rise of the pressure in the high pressure passage 20f is expected. In this case, the vehicle wheel at the inside of the turn is specified in the same manner as in step 672, and the control valve E or F is closed for the front vehicle wheel at the outside of the turn to be braked later, while the control valve E or F of the vehicle wheel at the inside of the turn is opened. Alternatively, both of the control valves E and F may be opened. In this case, although the pressurization of the high pressure passage 20f is not much expected, if the pump 22f is operated prior to the automatic braking, it is possible to obtain the condition that the pump 22f is in full operation when the automatic braking is started, whereby a good responsiveness of the automatic braking is ensured.

Figure 17:
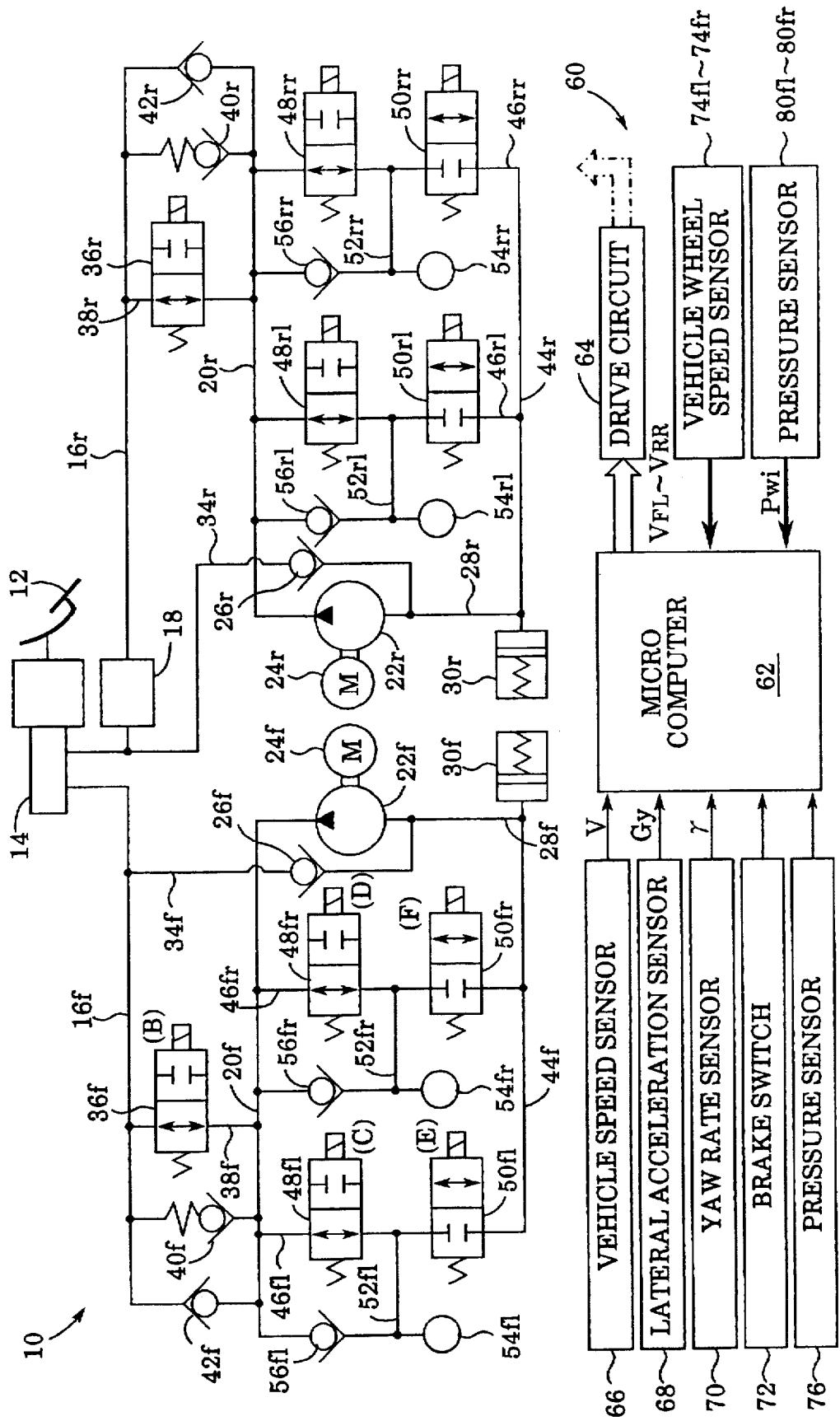
FIG. 17 is a diagrammatical view showing a fluid hydraulic circuit and an electrical control means of the fourth embodiment of the brake system according to the present invention.

FIG. 17 is a diagrammatical view showing a fluid hydraulic circuit and an electrical control means of a fourth embodiment of the brake system according to the present invention. In FIG. 17, the portions corresponding to those shown in FIG. 1 are designated by the same reference numerals.

The fluid hydraulic circuit of this fourth embodiment is constructed in the same manner as that of the third embodiment, and though not shown in the fluid hydraulic circuit of FIG. 17, the respective wheel cylinders 54fl–54rr are equipped with pressure sensors 80fl–80rr for detecting respective internal pressure Pvi (i=fl, fr, rl, rr).

The brake force control according to the fourth embodiment will be described with reference to the flowcharts shown in FIGS. 18 and 19.

Steps 610–690 and steps 710 and 720 of this fourth embodiment are carried out in the same manner as in the third embodiment. In step 700, the pump 22 is operated and the changeover valve B is closed, and in accordance with the routine of FIG. 19 a pressure uprise control of the wheel cylinder of the front vehicle wheel at the outside of the turn is carried out.

Figure 19:
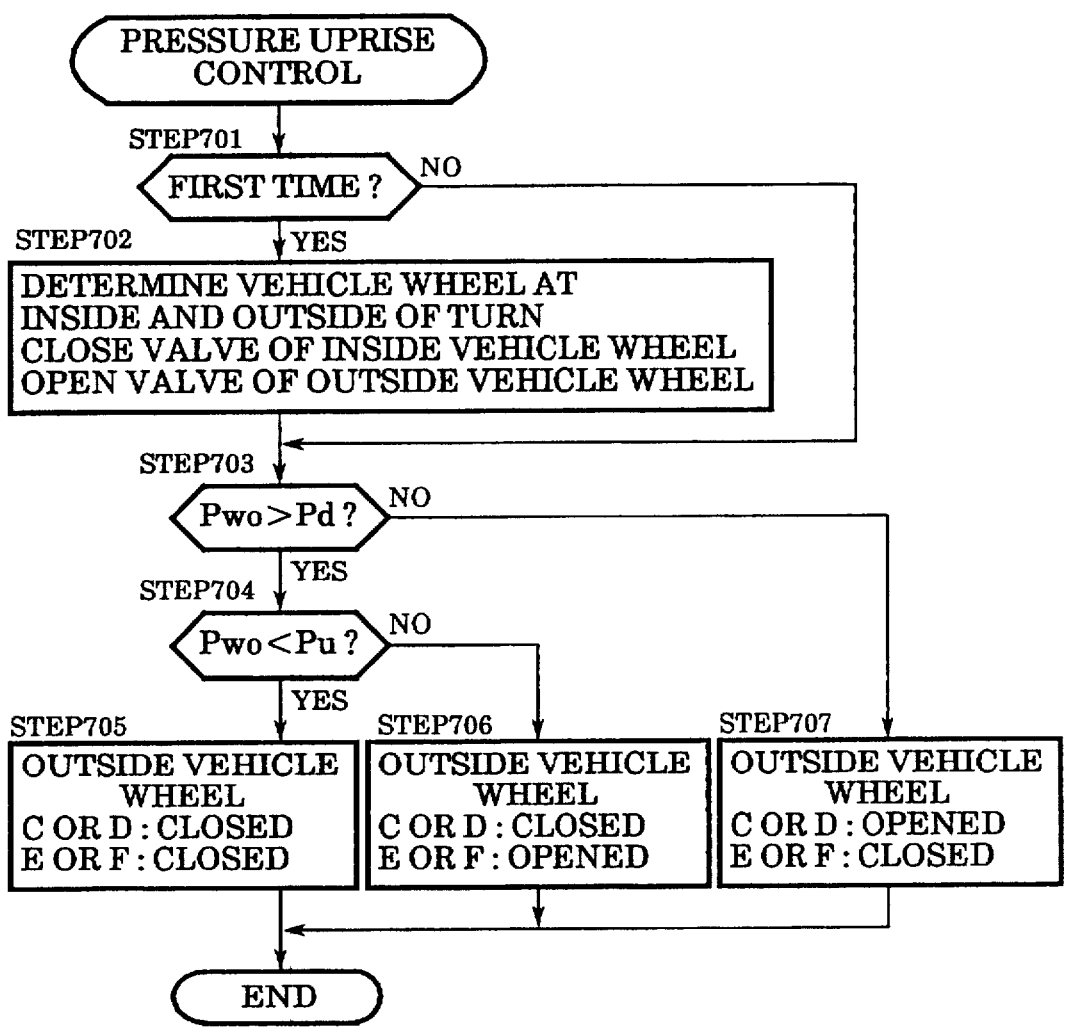
FIG. 19 is a flowchart showing a pressurized control routine in the fourth embodiment.

In step 701 of the flowchart shown in FIG. 19, it is tested if the yes answer of step 640 and the no answer of step 650 are the first answers, i.e. it is just after the absolute value of spin value SV has exceeded the first standard value SV1, and if the answer is yes, then in step 702 the vehicle wheel at the outside of the turn is specified based upon the lateral acceleration Gy, and the control valves C and E or D and F for the front vehicle wheel at the inside of the turn are closed, while the control valves for the front vehicle wheel at the outside of the turn are opened.

In step 703, it is tested if the pressure Pwo of the wheel cylinders 54fl or 54fr of the front vehicle wheel at the outside of the turn is greater than a lower standard value Pd (a positive constant), and if the answer is no, the control process proceeds to step 707, whereas if the answer is yes, the control process proceeds to step 704, where it is tested if the pressure Pwo is smaller than an upper standard value Pu (a positive constant greater than Pd), and if the answer is yes the control process proceeds to step 705, where the control valve C or D of the front vehicle wheel at the outside of the turn is closed and the control valve E or F is also closed, whereas if the answer of step 704 is no, then in step 706 the control valve C or D for the front vehicle wheel at the outside of the turn is closed, while the control valve E or F is opened. In step 707, the control valve C or D for the front vehicle wheel at the outside of the turn is opened, while the control valve E or F is closed.

Figure 18:
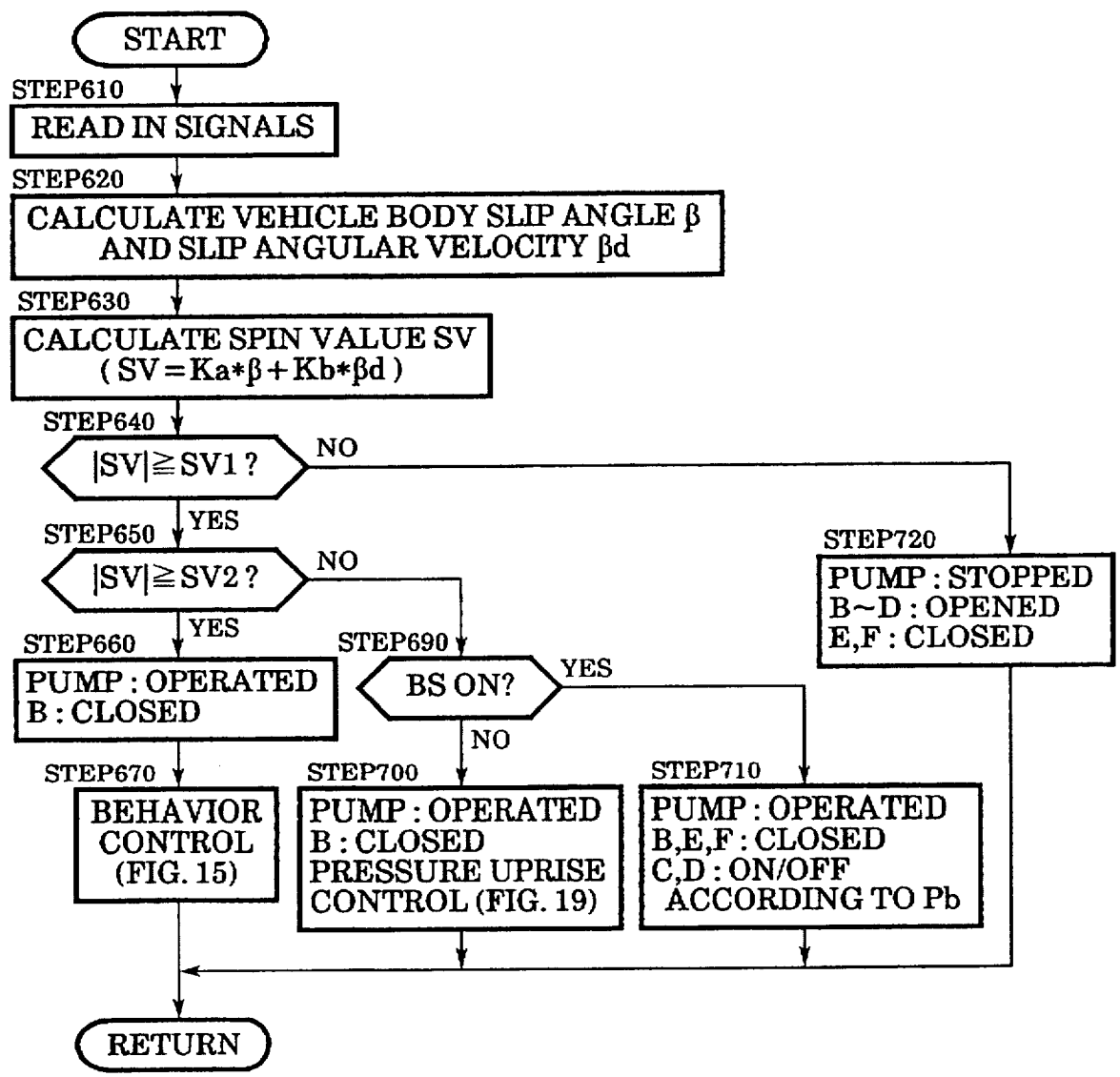
FIG. 18 is a flowchart showing a braking force control routine of the fourth embodiment.

Thus, in this fourth embodiment, the steps except step 700 of the flowchart shown in FIG. 18, the steps are all carried out in the same manner as in the third embodiment. When the turn behavior of the vehicle becomes unstable such that the absolute value of spin value SV exceeds the first standard value SV1, and if the driver is doing no braking operation, the pump 22f is operated with the changeover valve B being closed, and according to the pressurized control routine of FIG. 19 the pressure Pwo of the wheel cylinder 54fl or 54fr of the vehicle wheel at the outside of the turn is increased to a predetermined pressure range greater than Pd and lower than Pu, so that thereby the brake system is prepared for the automatic braking for the behavior control.

In the fourth embodiment shown in the figure, although the behavior control is carried out such that the braking force of the front vehicle wheel at the outside of the turn is controlled based upon a target slip rate according to the routine shown in FIG. 15, since the respective wheel cylinders are equipped with pressure sensors, the braking forces at the respective vehicle wheels may be controlled according to the manner of pressure feedback so as to be approached to the respective target braking forces obtained based upon the amount of spin value SV.

Although the present invention has been described in detail with respect to several particular embodiments thereof, it will be apparent for those skilled in the art that the present invention is not limited to the shown embodiments and that various other embodiments are possible within the scope of the present invention.

For example, when an automatic operation of the brake system is forecast, in the first and second embodiments, the wheel cylinders of the front left and right vehicle wheels may be pressurized, while in the fourth embodiment the wheel cylinder of only the front vehicle wheel at the outside of the turn may be pressurized. However, the wheel cylinder of the rear vehicle wheels may be pressurized in accordance with variations of the behavior control.

Further, in the same construction as those of the third and fourth embodiments, instead of step 700, the pump 22f may be operated with the changeover B being closed, and the target slip rate Sr in formula 1 of the first embodiment may be determined to be a constant value not to cause any essential braking force, and the pressure of the wheel cylinder of the front vehicle wheel at the outside of the turn may be controlled by a slip rate servo described with reference to the first embodiment.

We claim:

1. A brake system of a vehicle having a vehicle body and a plurality of vehicle wheels, said brake system comprising a reservoir, a plurality of wheel cylinders each adapted to apply a braking force to a corresponding one of said plurality of vehicle wheels when supplied with a working fluid at a raised pressure, an inlet passage means adapted to supple the working fluid to said plurality of wheel cylinders, a pump means for pumping the working fluid from said reservoir to said inlet passage means to provide a predetermined raised pressure source of the working fluid in said inlet passage means, fluid circuit means including fluid flow control valves for selectively conducting the working fluid from said inlet passage means to each one of said wheel cylinders, and an automatic control means for controlling said pump means and said fluid flow control valves, wherein said automatic control means comprises means for estimating a parameter related with running of the vehicle, said parameter relating to a probable requirement for applying braking to at least one selected from said plurality of vehicle wheels by approaching a predetermined value thereof, said automatic control means controlling said pump means and said fluid flow control valves such that, when said parameter approaches said predetermined value with a predetermined proximity thereto, said pump means is started for operation thereof so as to provide said predetermined raised pressure source in said inlet passage means while said flow control valves isolate all of the wheel cylinders from said inlet passage means, and when said parameter reaches said predetermined value, the wheel cylinder or cylinders corresponding to said selected vehicle wheel or wheels are supplied with the working fluid with a rise of pressure thereof available as modified from said predetermined raised pressure source in said inlet passage means under a control of said flow control valves.

2. A brake system according to claim 1, wherein said automatic control means controls said pump means and said fluid flow control valves further such that, when said parameter has approached said predetermined value with said predetermined or further proximity for a predetermined time duration but did never approach said predetermined value in the mean time, said pump means is stopped.

3. A brake system according to claim 1, wherein said automatic control means controls said fluid flow control valves such that the rise of pressure of the working fluid in the wheel cylinder or cylinders corresponding to said selected vehicle wheel or wheels after the reach of said parameter to said predetermined value is effected at a higher rate according as a shorter time has lapsed from a moment when said parameter approached said predetermined value with said predetermined proximity to a moment when said parameter reached said predetermined value.

4. A brake system according to claim 1, wherein said parameter estimation means estimates said parameter as a slip angle of the vehicle body, and said automatic control means determines said predetermined value of said parameter to be a relatively large predetermined slip angle value at which the vehicle would start to spin, said predetermined proximity being a cautionary slip angle allowance left for the vehicle body to increase slipping up to said predetermined slip angle value.

5. A brake system according to claim 1, wherein said parameter estimation means estimates said parameter as a distance between the vehicle and an obstacle located ahead of the vehicle, and said automatic control means determines said predetermined value of said parameter to be a minimum allowable distance between the vehicle and the obstacle, said predetermined proximity being a cautionary distance allowance left for the vehicle to approach the obstacle with said predetermined minimum allowable distance.

6. A brake system according to claim 5, wherein said automatic control means controls said pump means and said fluid flow control valves with a modification of said predetermined value and said predetermined proximity according to vehicle speed such that said minimum allowable distance and said distance allowance of proximity are increased along with increase of vehicle speed.

7. A brake system according to claim 6, wherein said automatic control means further comprises means for discriminating an obstacle located ahead of the vehicle between a stationary obstacle and a moving obstacle, and modifies said minimum allowable distance and said distance allowance of proximity further according to whether the obstacle is stationary or moving such that said minimum allowable distance and said distance allowance of proximity are more steeply increased along with increase of vehicle speed when the obstacle is stationary than when the obstacle is moving in a same direction as the vehicle.

8. A brake system of a vehicle having a vehicle body and a plurality of vehicle wheels, said brake system comprising a reservoir, a plurality of wheel cylinders each adapted to apply a braking force to a corresponding one of said plurality of vehicle wheels when supplied with a working fluid at a raised pressure, an inlet passage means adapted to supply the working fluid to said plurality of wheel cylinders, a pump means for pumping the working fluid from said reservoir to said inlet passage means to provide a predetermined raised pressure source of the working fluid in said inlet passage means, fluid circuit means including fluid flow control valves for selectively conducting the working fluid from said inlet passage means to each one of said wheel cylinders, and an automatic control means for controlling said pump means and said fluid flow control valves, wherein said automatic control means comprises means for estimating a parameter related with running of the vehicle, said parameter relating to a probable requirement for applying braking to at least one selected from said plurality of vehicle wheels by approaching a predetermined value thereof, said automatic control means controlling said pump means and said fluid flow control valves such that, when said parameter approaches said predetermined value with a predetermined proximity thereto, said pump means is started for operation thereof so as to provide said predetermined raised pressure source in said inlet passage means and the wheel cylinder or cylinders corresponding to said selected vehicle wheel or wheels are supplied with the working fluid with such a preliminary partial rise of pressure thereof available by a modification of said predetermined raised pressure source under a control of said fluid flow control valves that does not yet cause any substantial braking of the corresponding vehicle wheel or wheels, and when said parameter reaches said predetermined value, the wheel cylinder or cylinders corresponding to said selected vehicle wheel or wheels are supplied with the working fluid with a further substantial rise of pressure thereof available as also modified from said predetermined raised pressure source in said inlet passage means under a control of said flow control valves.

9. A brake system according to claim 8, wherein the brake system comprises a rotor and a brake pad for each of the vehicle wheels, said brake pad being adapted to be actuated by a corresponding one of said wheel cylinders to frictionally engage said rotor when the corresponding vehicle wheel is to be braked, said brake pad being apart from said rotor with a clearance when the corresponding vehicle wheel is not braked, said automatic control means controlling said fluid flow control valves such that said preliminary partial rise of pressure of the working fluid supplied to the wheel cylinder or cylinders of the selected vehicle wheel or wheels causes a movement of said brake pad toward said rotor as much as just to cancel said clearance.

* * * * *

UNITED STATES PATENT AND TRADEMARK OFFICE
CERTIFICATE OF CORRECTION

PATENT NO. : 5,797,663
DATED : August 25, 1998
INVENTOR(S) : Hiroshi KAWAGUCHI, Akio OKADA, Masashi OHTA It is certified that error appears in the above-identified patent and that said Letters Patent is hereby corrected as shown below:

On the title page, item [56], column 2, before line 2, insert:

-- 5,043,897    8/1991    Yoshino --; and before line 15 insert the following:

-- 5-305839    11/1993    Japan. --

Signed and Sealed this

Second Day of February, 1999

Attest:

Attesting Officer

*Acting Commissioner of Patents and Trademarks*